United States Patent
Moon et al.

(10) Patent No.: US 10,952,061 B2
(45) Date of Patent: *Mar. 16, 2021

(54) METHOD AND APPARATUS FOR TRANSMITTING A DISCOVERY SIGNAL, AND METHOD AND APPARATUS FOR RECEIVING A DISCOVERY SIGNAL

(71) Applicant: ELECTRONICS AND TELECOMMUNICATIONS RESEARCH INSTITUTE, Daejeon (KR)

(72) Inventors: Sung-Hyun Moon, Daejeon (KR); Cheulsoon Kim, Daejeon (KR); Ji Hyung Kim, Daejeon (KR); Minhyun Kim, Busan (KR); Junghoon Lee, Daejeon (KR); Eun-Young Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,728

(22) Filed: Dec. 4, 2019

(65) Prior Publication Data

US 2020/0112846 A1 Apr. 9, 2020

Related U.S. Application Data

(63) Continuation of application No. 15/577,601, filed as application No. PCT/KR2017/004261 on Apr. 21, 2017, now Pat. No. 10,547,998.

(30) Foreign Application Priority Data

Apr. 25, 2016 (KR) .................... 10-2016-0050325
Jun. 7, 2016 (KR) .................... 10-2016-0070544

(Continued)

(51) Int. Cl.
*H04W 8/00* (2009.01)
*H04B 7/26* (2006.01)
(Continued)

(52) U.S. Cl.
CPC .............. *H04W 8/005* (2013.01); *H04B 7/26* (2013.01); *H04J 11/0073* (2013.01);
(Continued)

(58) Field of Classification Search
CPC ......... H04L 27/26; H04L 5/00; H04L 5/0048; H04L 27/2692; H04L 27/2613;
(Continued)

(56) References Cited

U.S. PATENT DOCUMENTS 8,929,314 B2   1/2015   Kim et al.
2008/0298326 A1  12/2008  Pande et al.
(Continued)

FOREIGN PATENT DOCUMENTS

KR   10-2014-0095994 A   8/2014
WO   2015/138418 A1    9/2015
(Continued)

OTHER PUBLICATIONS

3GPP TR 36.872 V12.1.0, 3rd Generation Partnership Project; Technical Specification Group Radio Access Network; Small cell enhancements for E-UTRA and E-UTRAN—Physical layer aspects (Release 12), pp. 1-100, Dec. 20, 2013.
(Continued)

*Primary Examiner* — Lan-Huong Truong
(74) *Attorney, Agent, or Firm* — Rabin & Berdo, P.C.

(57) ABSTRACT

A transmission method of a base station is provided. The base station generates a first discovery signal block including a first PSS (primary synchronization signal) and a first SSS (secondary synchronization signal). The base station generates a second discovery signal block including a sec-
(Continued)

ond PSS and a second SSS. Also, the base station transmits the first discovery signal block and the second discovery signal block.

12 Claims, 19 Drawing Sheets

(30) Foreign Application Priority Data

Aug. 12, 2016 (KR) .................. 10-2016-0103036
Apr. 20, 2017 (KR) .................. 10-2017-0051283

(51) Int. Cl.
*H04J 11/00* (2006.01)
*H04L 5/00* (2006.01)
*H04L 27/26* (2006.01)
*H04W 48/12* (2009.01)

(52) U.S. Cl.
CPC .......... *H04J 11/0076* (2013.01); *H04L 5/005* (2013.01); *H04L 5/0053* (2013.01); *H04L 27/26* (2013.01); *H04L 27/2613* (2013.01); *H04L 27/2692* (2013.01); *H04W 48/12* (2013.01); *H04B 7/2606* (2013.01); *H04L 5/0007* (2013.01); *H04L 27/264* (2013.01)

(58) Field of Classification Search
CPC ... H04L 5/0053; H04L 5/0007; H04L 27/264; H04B 7/26; H04B 7/2606; H04J 11/0076; H04J 11/0073; H04W 8/005; H04W 48/12
See application file for complete search history.

(56) References Cited

U.S. PATENT DOCUMENTS

| 2010/0296429 | A1 | 11/2010 | Han et al. | |
|---|---|---|---|---|
| 2014/0171073 | A1 | 6/2014 | Kim et al. | |
| 2014/0334337 | A1* | 11/2014 | Li | H04W 8/005 |
| | | | | 370/254 |
| 2015/0011230 | A1 | 1/2015 | Noh et al. | |
| 2015/0188650 | A1 | 7/2015 | Au et al. | |
| 2015/0350941 | A1 | 12/2015 | You et al. | |
| 2015/0358899 | A1 | 12/2015 | Ko et al. | |
| 2016/0234878 | A1 | 8/2016 | Svedman et al. | |
| 2016/0269885 | A1* | 9/2016 | Kim | H04W 72/0473 |
| 2016/0330780 | A1 | 11/2016 | Kim et al. | |
| 2017/0118054 | A1* | 4/2017 | Ma | H04L 5/0064 |
| 2017/0118665 | A1 | 4/2017 | Park et al. | |
| 2017/0201980 | A1* | 7/2017 | Hakola | H04W 72/1263 |

FOREIGN PATENT DOCUMENTS

| WO | 2015133823 A1 | 9/2015 |
|---|---|---|
| WO | 2015/167247 A1 | 11/2015 |
| WO | 2016012844 A1 | 1/2016 |

OTHER PUBLICATIONS

3GPP TS 36.211 V12.6.0, 3rd Generation Partnership Project; Technical Specification Group Radio Access Network; Evolved Universal Terrestrial Radio Access (E-UTRA); Physical channels and modulation (Release 12), pp. 1-136, Jun. 2015.
ETRI, "Band-agnostic initial access for NR", R1-166944, 3GPP TSG RAN WG1 Meeting #86, Gothenburg, Sweden, pp. 1-4, Aug. 22-26, 2016.
ZTE, "Discussion on timing acquisition for small cell discovery", R1-140288, 3GPP TSG-RAN1#76, Prag, Czech Republic, pp. 1-3, Jan. 31, 2014.

* cited by examiner

METHOD AND APPARATUS FOR TRANSMITTING A DISCOVERY SIGNAL, AND METHOD AND APPARATUS FOR RECEIVING A DISCOVERY SIGNAL

CROSS-REFERENCE TO RELATED APPLICATIONS

This application is a continuation of U.S. application Ser. No. 15/577,601, filed on Nov. 28, 2017, and allowed on Sep. 26, 2019, which was a National Stage application of PCT/KR2017/004261, filed on Apr. 21, 2017, and claims priority to and the benefit of Korean Patent Applications No. 10-2016-0050325, filed on Apr. 25, 2016, No. 10-2016-0070544, filed on Jun. 7, 2016, No. 10-2016-0103036, filed on Aug. 12, 2016, and No. 10-2017-0051283, filed on Apr. 20, 2017, the entire contents of which are incorporated herein by reference.

TECHNICAL FIELD

The present invention relates to a method and an apparatus for transmitting/receiving a discovery signal.

BACKGROUND ART

A wireless communication system supports a frame structure according to the technical specification. For example, a 3GPP (3rd Generation Partnership Project) LTE (Long Term Evolution) system supports frame structures of three types. The frame structures of three types include a type 1 frame structure applicable to FDD (frequency division duplex), a type 2 frame structure applicable to TDD (time division duplex), and a type 3 frame structure for a transmission of a unlicensed frequency band.

In a wireless communication system such as the LTE system, a TTI (transmission time interval) means a basic time unit with which an encoded data packet is transmitted through a physical layer signal.

A TTI of the LTE system is composed of one subframe. That is, a time domain length of a PRB (physical RB (resource block)) pair as a minimum unit of a resource allocation is 1 ms. To support the transmission of the 1 ms TTI unit, a physical signal and a channel are mainly defined by a subframe unit. For example, a CRS (cell-specific reference signal) may be permanently transmitted to every subframe, and a PDCCH (physical downlink control channel), a PDSCH (physical downlink shared channel), a PUCCH (physical uplink control channel), and a PUSCH (physical uplink shared channel) may be transmitted for each subframe. In contrast, a PSS (primary synchronization signal) and an SSS (secondary synchronization signal) exist for every fifth subframe, and a PBCH (physical broadcast channel) exists for every tenth subframe.

Meanwhile, in the wireless communication system, a technique for transmitting/receiving the signal for a heterogeneous frame structure based on a plurality of numerologies is required.

DISCLOSURE

Technical Problem

The present invention provides a method and an apparatus for transmitting/receiving a signal for a heterogeneous frame structure based on a plurality of numerologies in a wireless communication system.

Technical Solution

According to an exemplary embodiment of the present invention, a transmission method of a base station is provided. The transmission method of the base station includes: generating a first discovery signal block including a first PSS (primary synchronization signal) and a first SSS (secondary synchronization signal); generating a second discovery signal block including a second PSS and a second SSS; and transmitting the first discovery signal block and the second discovery signal block.

Time and frequency distances between a resource for the first PSS and a resource for the first SSS may be the same as time and frequency distances between a resource of the second PSS and a resource for the second SSS.

The first discovery signal block may further include a first PBCH (physical broadcast channel), and the second discovery signal block may further include a second PBCH.

Time and frequency distances between a resource for the first PSS and a resource for the first PBCH may be the same as time and frequency distances between a resource for the second PSS and a resource for the second PBCH.

The generating of the second discovery signal block may include applying TDM (time division multiplexing) between the first discovery signal block and the second discovery signal block.

A time distance between the first discovery signal block and the second discovery signal block may be determined based on a predefined first value.

A time distance between a first PRACH block and a second PRACH block for PRACH (physical random access channel) reception of the base station may be determined based on a predefined second value.

The first PRACH block and the second PRACH block may exist within a cell search bandwidth, which is a bandwidth of sub-bands occupied by the first discovery signal block and the second discovery signal block.

A resource occupied by the first discovery signal block may include continuous time domain symbols.

The first PSS may be temporally earlier than the first SSS within the first discovery signal block.

The transmission method of the base station may further include determining the time distance between a first PRACH block and a second PRACH block for a PRACH (physical random access channel) reception of the base station.

The generating of the second discovery signal block may include determining the time distance between the first discovery signal block and the second discovery signal block based on a traffic condition.

According to another exemplary embodiment of the present invention, a transmission method of a base station is provided. The transmission method of the base station includes: generating at least one discovery signal block including a PSS (primary synchronization signal) and an SSS (secondary synchronization signal); and allocating a part or all of resources belonging to a predefined resource pool for a transmission of a discovery signal to the at least one discovery signal block.

The at least one discovery signal block may be plural.

The transmission method of the base station may further include determining the time distance between the plurality of discovery signal blocks depending on a traffic condition.

The transmission method of the base station may further include configuring a duration and a periodicity of a DMW (discovery signal measurement window) to a terminal so that the terminal receives the at least one discovery signal block.

The configuring of the duration and the periodicity of the DMW may include configuring the DMW periodicity as a larger value than a periodicity value that is predefined for other terminals that are not connected to the base station by RRC (radio resource control) and configuring the DMW duration as a smaller value than a duration value that is predefined for the other terminals when the terminal and the base station are connected by the RRC.

The at least one discovery signal block may be plural.

The allocating may include transmitting a part among the plurality of discovery signal blocks within the DMW.

The transmission method of the base station may further include arbitrarily determining the time distance between a plurality of PRACH (physical random access channel) blocks for PRACH reception of the base station.

The transmission method of the base station may further include transmitting at least one among a plurality of PRACH (physical random access channel) formats to a terminal through a PBCH (physical broadcast channel) included in a first discovery signal block among the at least one discovery signal block.

The time distance between the plurality of discovery signal blocks may be applied as the same value for each periodicity of a discovery signal occasion.

According to another exemplary embodiment of the present invention, a reception method of a terminal is provided. The receiving method of the terminal includes: determining a DMW (discovery signal measurement window); monitoring a PSS (physical synchronization signal) within the DMW; and selecting one among a plurality of PSSs when finding the plurality of PSSs corresponding to a plurality of discovery signal blocks within the DMW.

The determining may include determining a duration and a periodicity for the DMW based on a predefined duration value and a predefined periodicity value when the terminal is not connected to a base station by RRC (radio resource control).

The determining may include receiving configuration of a duration and a periodicity for the DMW from a base station when the terminal is connected to the base station by RRC (radio resource control).

The DMW periodicity configured by the base station may have a larger value than the periodicity value that is predefined for other terminals that is not connected to the base station by the RRC.

The DMW duration configured by the base station may have a smaller value than a duration value that is predefined for the other terminals.

The reception method of the terminal may further include monitoring an SSS (secondary synchronization signal) or a PBCH (physical broadcast channel) included in a first discovery signal block corresponding to the selected PSS.

The selecting may include selecting a PSS having a best reception performance or satisfying a predefined reception performance condition among the plurality of PSSs.

Advantageous Effects

According to an exemplary embodiment of the present invention, the transmitting/receiving method and the apparatus thereof for the heterogeneous frame structure based on the plurality of numerologies can be provided.

MODE FOR INVENTION

Figure 1:
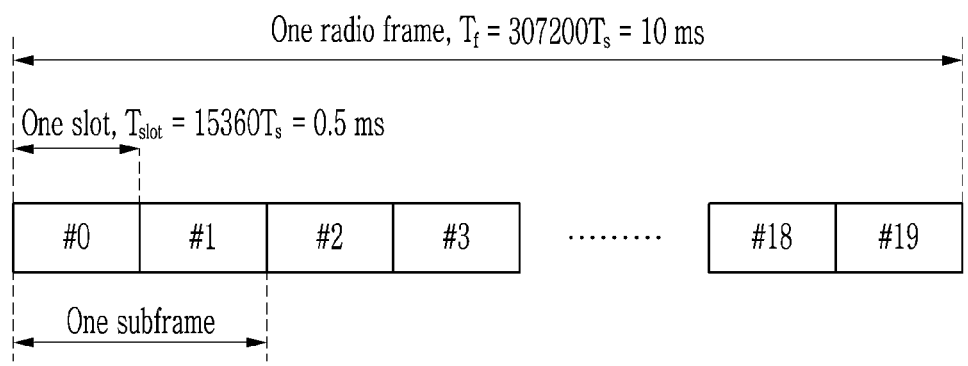
FIG. 1 is a view showing a type 1 frame structure of an LTE system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the present specification.

In the present specification, redundant description of the same constituent elements is omitted.

Also, in the present specification, it is to be understood that when one component is referred to as being "connected" or "coupled" to another component, it may be connected or coupled directly to another component or be connected or coupled to another component with the other component intervening therebetween. On the other hand, in the present specification, it is to be understood that when one component is referred to as being "connected or coupled directly" to another component, it may be connected or coupled to another component without the other component intervening therebetween.

It is also to be understood that the terminology used herein is only for the purpose of describing particular embodiments, and is not intended to be limiting of the invention.

Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In the present specification, 'A or B' may include 'A', 'B', or 'A and B'.

In the present specification, a terminal may indicate a mobile terminal, a mobile station, an advanced mobile station, a high reliability mobile station, a subscriber station, a portable subscriber station, an access terminal, user equipment, and the like, or may include whole or partial functions of the mobile terminal, the mobile station, the advanced mobile station, the high reliability mobile station, the subscriber station, the portable subscriber station, the access terminal, the user equipment, and the like.

Also, in the present specification, a base station (BS) may indicate an advanced base station, a high reliability base station (HR-BS), a node B, an evolved node B (eNodeB), an access point, a radio access station, a base transceiver station, a mobile multihop relay (MMR)-BS, a relay station executing a base station function, a high reliability relay station executing a base station function, a repeater, a macro base station, a small base station, and the like, or may include whole or partial functions of the advanced base station, the HR-BS, the nodeB, the eNodeB, the access point, the radio access station, the transceiver base station, the MMR-BS, the relay station, the high reliability relay station, the repeater, the macro base station, the small base station, and the like.

FIG. 1 is a view showing a type 1 frame structure of an LTE system.

One radio frame has 10 ms (=307200$T_s$) length and consists of ten subframes. Here, $T_s$ is a sampling time and has a value of $T_s$=1/(15 kHz*2048). Each subframe has the length of 1 ms, and one subframe consists of two slots of 0.5 ms length. One slot consists of seven time domain symbols (for example, an OFDM (orthogonal frequency division multiplexing) symbol) in a case of a normal CP (cyclic prefix), and consists of six time domain symbols (for example, the OFDM symbol) in a case of an extended CP. In the present specification, the time domain symbol may be the OFDM symbol, or an SC (single carrier)-FDMA (frequency division multiple access) symbol. However, this is merely an example, and an exemplary embodiment of the present invention may be applied in a case in which the time domain symbol is the OFDM symbol or a different symbol from the SC-FDMA symbol.

Figure 2:
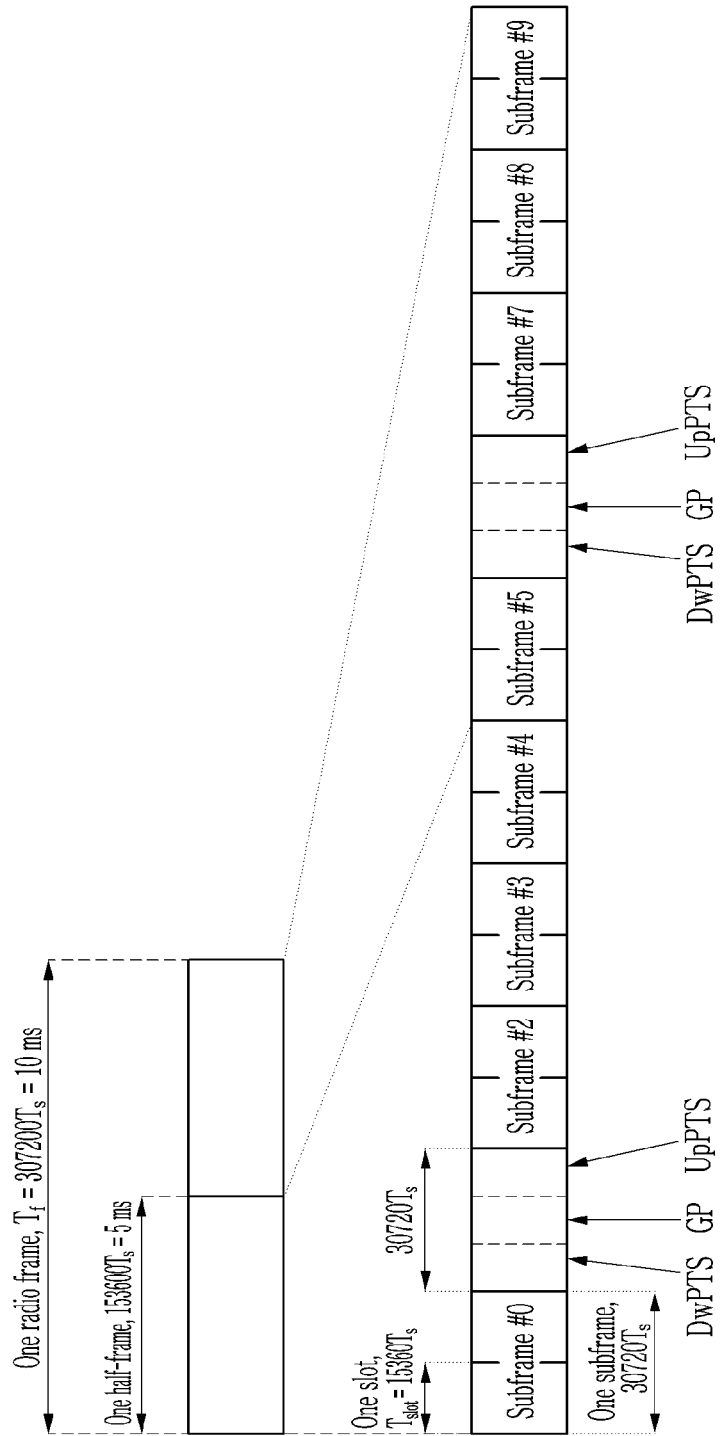
FIG. 2 is a view showing a type 2 frame structure of an LTE system.

FIG. 2 is a view showing a type 2 frame structure of an LTE system.

A relationship between the radio frame, the subframe, and the slot and each length thereof are the same as the case of the type 1 frame structure. As a difference between the type 2 frame structure and the type 1 frame structure, in the type 2 frame structure, one radio frame consists of a downlink (DL) subframe, an uplink (UL) subframe, and a special subframe.

The special subframe exists between the downlink subframe and the uplink subframe, and includes a DwPTS (downlink pilot time slot), a GP (guard period), and an UpPTS (uplink pilot time slot).

One radio frame includes two special subframes in a case in which a downlink-uplink switching periodicity is 5 ms, and includes one special subframe in a case in which the downlink-uplink switching periodicity is 10 ms. In detail, FIG. 2 shows a case in which the downlink-uplink switching periodicity is 5 ms, and subframe 1 and subframe 6 are the special subframes.

The DwPTS is used for cell search, synchronization, or channel estimation. The GP is a period for removing an interference generated in the uplink of the base station due to a multipath delay difference of the terminals. In the UpPTS period, the transmission of the PRACH (physical random access channel) or the SRS (sounding reference signal) is possible. The wireless communication system according to an exemplary embodiment of the present invention may be applied to various wireless communication networks. For example, the wireless communication system may be applied to a current wireless access technology (RAT: radio access technology)-based wireless communication network, or the 5G and beyond 5G wireless communication networks. The 3GPP develops a new RAT-based 5G technical specification satisfying IMT (International Mobile Telecommunications)-2020 requirements, and this new RAT is referred to as NR (new radio). In the present specification, for convenience of description, the NR-based wireless communication system is described as an example. However, it is merely an example, the present invention is not limited thereto, and the present invention may be applied to various wireless communication systems.

As one among differences between the NR and a conventional 3GPP system (for example, CDMA (code division multiple access), LTE, etc.), NR uses a wide range of frequency bands in order to increase the transmission capacity. Related to this, the WRC (World Radiocommunication Conference)-15 hosted by the ITU (International Telecommunication Union) determined a WRC-19 agenda, and the WRC-19 agenda includes consideration of a 24.25-86 GHz band as the candidate frequency band for the IMT-2020. The 3GPP considers the frequency band from 1 GHz or less to 100 GHz as the NR candidate frequency band.

As a waveform technology for the NR, OFDM (orthogonal frequency division multiplexing), filtered OFDM, GFDM (generalized frequency division multiplexing), FBMC (filter bank multicarrier), UFMC (universal filtered multicarrier), etc. are being considered as the candidate technology.

In the present specification, as the waveform technology for the wireless access, a case using a CP-based OFDM (CP-OFDM) is assumed. However, this is merely for convenience of explanation, the present invention is not limited to the CP-OFDM, and it can be applied to various waveform technologies. In general, in a category of the CP-OFDM technology, the CP-OFDM technology applied with windowing and/or filtering or spread spectrum OFDM technology (for example, DFT-spread OFDM) is included.

Table 1 below represents an example of an OFDM system parameter configuration for the NR system.

In Table 1 (an example of the OFDM system parameter configuration), the frequency band of 700 MHz-100 GHz is divided into three regions (i.e., a low frequency band (–6 GHz), a high frequency band (3-40 GHz), and a super high frequency band (30-100 GHz)), and different OFDM numerologies from each other are applied to each frequency band. In this case, one of main factors determining subcarrier spacing of the OFDM system is a carrier frequency offset (CFO) suffered by a receiving terminal. The carrier frequency offset (CFO) has a characteristic that it increases in proportion to the operation frequency due to a Doppler effect and a phase drift. Accordingly, to block performance degradation by the carrier frequency offset, the subcarrier spacing must be increased in proportion to the operation frequency. In contrast, if the subcarrier spacing is very large, there is a drawback that a CP overhead increases. Accordingly, the subcarrier spacing must be defined as an appropriate value considering the channel and the RF (radio frequency) characteristic for each frequency band.

The subcarrier spacing of SETs A, B, and C of Table 1 is 16.875 kHz, 67.5 kHz, and 270 kHz, respectively, which is approximately in proportion to a target operation frequency, and is configured to make a difference of four times.

TABLE 1

|  | Set A | Set B | Set C |
| --- | --- | --- | --- |
| Carrier frequency | Low freq. (–6 GHz) | High freq. (3-40 GHz) | Very high freq. (30-100 GHz) |
| Subcarrier spacing | 16.875 kHz | 67.5 kHz | 270 kHz |
| CP overhead | 5.2% | 5.2% | 5.2% |
| Number of OFDM symbols per 1 ms | 16 | 64 | 256 |

Meanwhile, the values of the subcarrier spacing used in Table 1 are merely exemplary, and the subcarrier spacing may be designed with as many other values as necessary. For example, 15 kHz of the conventional LTE subcarrier spacing is used as a base numerology, and the subcarrier spacing (for example, 30 kHz, 60 kHz, 120 kHz, 240 kHz, etc.) scaled with multiplication by power of two based on this may be used for the numerology scaling. This is illustrated in Table 2 (as an example of the OFDM system parameter configuration). To configure the subcarrier spacing to make the difference by multiplication by power of two between the subcarrier spacing of the heterogeneous numerologies may be advantageous to the operation (for example, carrier aggregation, dual connectivity, or multiplexing of the heterogeneous numerologies within one carrier) between the heterogeneous numerologies.

TABLE 2

|  | Set A | Set B | Set C | Set D | Set E |
| --- | --- | --- | --- | --- | --- |
| Subcarrier spacing | 15 kHz | 30 kHz | 60 kHz | 120 kHz | 240 kHz |
| CP overhead | 6.7% | 6.7% | 6.7% | 6.7% | 6.7% |
| Number of OFDM symbols per 1 ms | 14 | 28 | 56 | 112 | 224 |

One numerology may be basically used for one cell (or one carrier), and may be used for a special time-frequency resource within one carrier. The heterogeneous numerology may be used for the different operation frequency bands from each other as illustrated in Table 1, and may be used to support different service types from each other in the same frequency band. As an example of the latter, the SET A of Table 1 can be used for the eMBB (enhanced mobile broadband) service of the 6 GHz band or less, and the SET B or the SET C of Table 1 can be used for the URLLC (ultra-reliable low latency communication) service of the 6 GHz band or less. Meanwhile, to support the mMTC or the MBMS (multimedia broadcast multicast services) service, the numerology having the smaller subcarrier spacing than that of the subcarrier spacing of the basic numerology may be used. For this, in a case in which the subcarrier spacing of the basic numerology is 15 kHz, the subcarrier spacing of 7.5 kHz or 3.75 kHz may be considered.

Hereinafter, the method and the apparatus for transmitting the signal for the heterogeneous frame structure based on the plurality of numerologies in the wireless communication system will be described.

[Carrier Raster]

To discover a cell (or a carrier) in initial cell search process, a terminal must be able to detect the synchronization signal of the corresponding cell for all candidate frequencies on the carrier raster in the frequency band to which the corresponding cell belongs. The synchronization signal may be transmitted with reference to one frequency among the candidate frequencies. For example, in the LTE system, the carrier raster spacing is 100 kHz, and the DC (direct current) subcarrier as the center of the subcarriers to which the synchronization signal is transmitted is aligned on a specific graduation point of the carrier raster.

When the detection of the synchronization signal is successful, the terminal may derive the center frequency position of the cell (the carrier) from the frequency value of the corresponding carrier raster graduation point. In the case of the LTE system, since the center frequency of the synchronization signal and the center frequency of the cell (or the carrier) are the same, the terminal may obtain the center frequency of the cell (or the carrier) without help of the base station.

On the other hand, to increase the frequency resource utilization efficiency, the new carrier raster may be designed. Next, the carrier raster may mean a group of the candidate reference frequencies of the synchronization signal or may mean a group of the candidate center frequencies of the cell (or the carrier). The former and the latter can generally be separated from one another.

In a case of an intra-band contiguous carrier aggregation, to minimize the idle band inevitably generated between the carriers, the frequency spacing of the carrier raster may be determined as an integer multiple of the subcarrier spacing. This is referred to as a method M100.

Also, when it is assumed that one resource block consists of N resource elements in the frequency domain, the raster spacing may be determined as an integer multiple of the multiplication of the subcarrier spacing and N. This is referred to as a method M101. For example, the spacing of the carrier raster for a frequency band using the numerology having a subcarrier spacing of 15 kHz may be a multiple of 15 kHz by the method M100. In this case, if N=12 is assumed, the raster spacing may be a multiple of 180 kHz or may be 180 kHz itself by the method M101.

Figure 3:
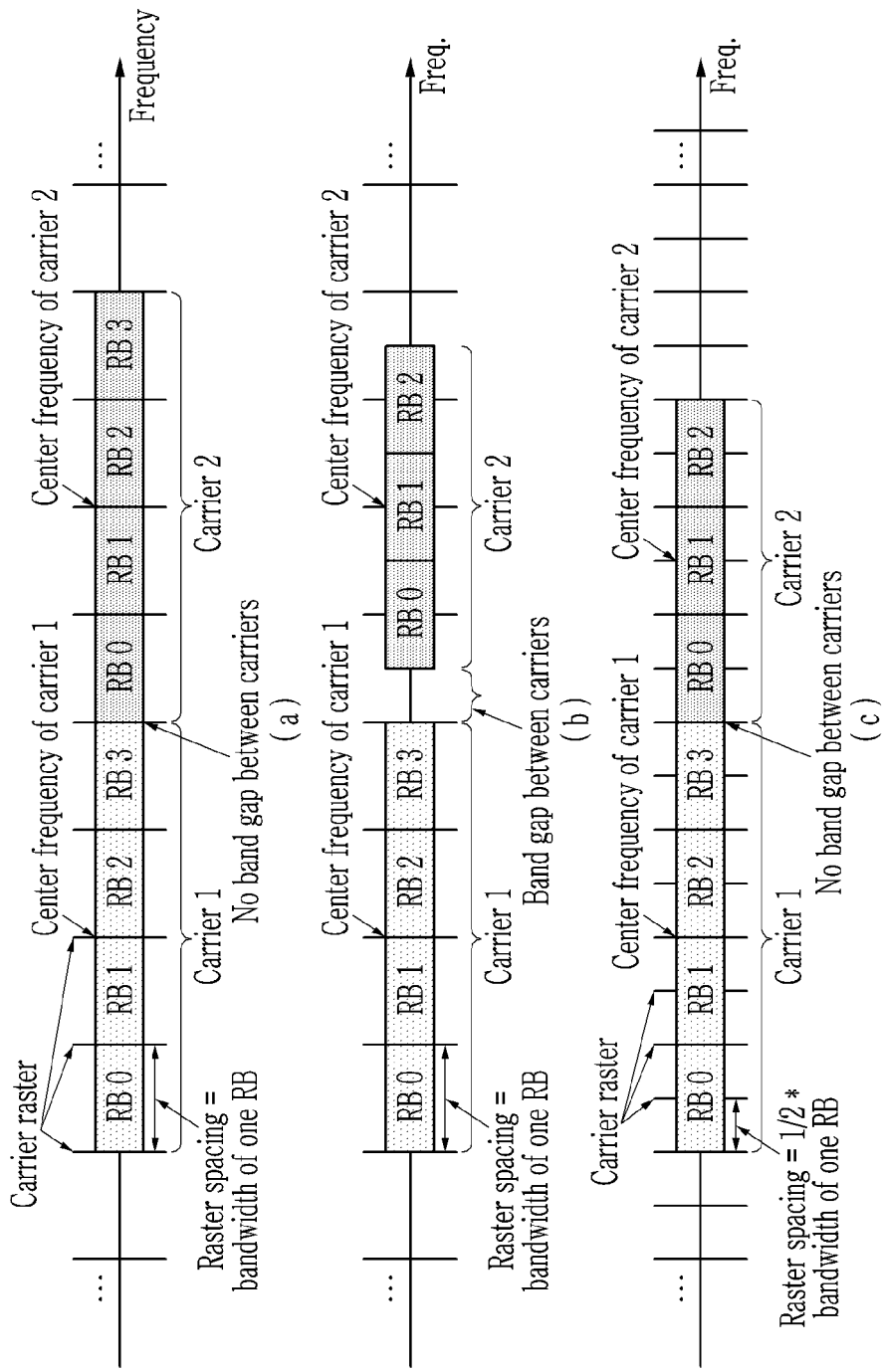
FIG. 3 is a view showing a carrier raster and a carrier allocation based on a method M101 or a method M102 according to an exemplary embodiment of the present invention.

FIG. 3 is a view showing a carrier raster and carrier allocation based on a method M101 or a method M102 according to an exemplary embodiment of the present invention.

In detail, (a) and (b) of FIG. 3 illustrate a case in which the carrier raster spacing is the same as the bandwidth occupied by one resource block as an exemplary embodiment of the method M101.

As illustrated in (a) of FIG. 3, when two adjacent carriers (Carrier 1 and Carrier 2) both have an even number (for example, four) of resource blocks (for example, RB 0, RB 1, RB 2, and RB 3), the method M101 may perform the carrier allocation as there is no idle band (or band gap) between the carriers (Carrier 1, Carrier 2). This may be applied the same or a similar way when both of two adjacent carriers have an odd number of resource blocks.

However, as illustrated in (b) of FIG. 3, when one carrier (Carrier 1) has an even number (for example, four) of resource blocks (for example, RB 0-RB 3) and the other carrier (Carrier 2) adjacent thereto has an odd number (for example, three) of resource blocks (for example, RB 0-RB 2), the idle band (or the band gap) between the carriers (Carrier 1, Carrier 2) may be inevitably generated.

To solve the above-described problem, the raster spacing may be determined as the multiplication of the subcarrier spacing and N/2, that is, half of the bandwidth occupied by one resource block. This is referred to as a method M102. For example, when the subcarrier spacing is 15 kHz and N=12, the raster search spacing may be 90 kHz. The exemplary embodiment of the method M102 is illustrated in (c) of FIG. 3.

As illustrated in (c) of FIG. 3, when one carrier (Carrier 1) has the even number (for example, four) of resource blocks (for example, RB 0-RB 3) and the other carrier (Carrier 2) has the odd number (for example, three) of resource blocks (for example, RB 0-RB 2), the method M102 may perform the carrier allocation as there is no idle band (or the band gap) between the carriers (Carrier 1, Carrier 2).

For the method M101 and the method M102, the center frequency position design is important. If, like the LTE downlink, when one subcarrier of the center frequency is defined as the DC (direct current) subcarrier and the DC subcarrier is excluded from the composition of resource blocks, even if the method M101 or the method M102 is used, the idle band may be inevitably generated between the carriers due to the frequency part occupied by the DC subcarrier. In contrast, like the LTE uplink, when the center frequency is defined as the middle between two subcarriers and the resource block is composed by using all subcarriers (however, the subcarrier of a guard band is excluded), the above-described effect of the method M101 or the method M102 may be obtained. This may also be established for the method described later.

On the other hand, as described above, a plurality of numerologies may be used in one frequency band. Here, one frequency band may mean a specific frequency range, and the specific frequency range may be wide or narrow. For example, a specific frequency range may be the bandwidth of one carrier, may be one frequency band having a bandwidth of several to several hundreds of MHz, or may be a wider region than that.

Figure 4:
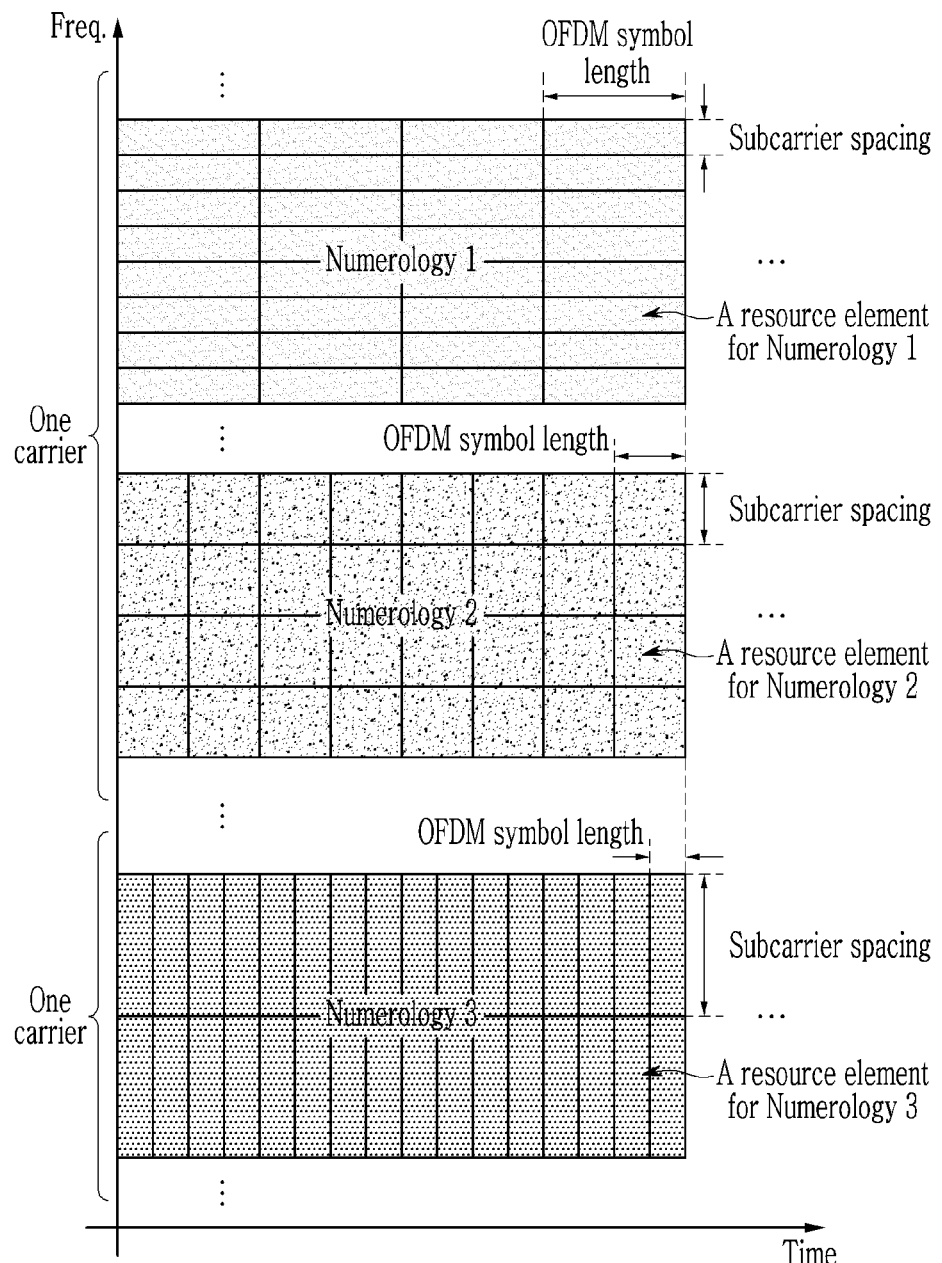
FIG. 4 is a view showing a case in which a plurality of numerologies are used in a common frequency band.

FIG. 4 is a view showing a case in which a plurality of numerologies are used in a common frequency band. In detail, FIG. 4 illustrates a case in which three heterogeneous numerologies (Numerology 1, Numerology 2, and Numerology 3) are used in a common frequency band.

In FIG. 4, it is assumed that the subcarrier spacing of Numerology 2 is larger than the subcarrier spacing of Numerology 1, and the subcarrier spacing of Numerology 3 is larger than the subcarrier spacing of Numerology 2. This is expressed by the difference between the time domain of the resource grid lengths (the difference between the OFDM symbol lengths) or the difference between the frequency domain of the resource grid lengths in FIG. 4. For example, when the subcarrier spacing of Numerology 1 is 15 kHz, the subcarrier spacing of Numerology 2 and Numerology 3 may be 30 kHz and 60 kHz, respectively.

A plurality of heterogeneous numerologies may be respectively used for the different carriers, and may be used together in one carrier. In detail, FIG. 4 illustrates a case in which Numerology 1 and Numerology 2 coexist within one carrier and Numerology 3 constitutes one carrier by itself.

On the other hand, when a plurality of numerologies are used within one frequency band, the carrier raster may be defined for each numerology. This is referred to as a method M110. In this case, to distinguish the graduation of the carrier raster for each numerology, an offset of the carrier raster graduation may be determined. This is referred to as a method M111.

For example, the carrier raster of Numerology 1 can have a 0 kHz offset and a 100 kHz spacing, and the carrier raster of Numerology 2 can have a 50 kHz offset and a 200 kHz spacing. That is, the frequency such as 100 kHz, 200 kHz, 300 kHz, etc. may be the center frequency candidates of Numerology 1, and the frequency such as 50 kHz, 250 kHz, 450 kHz, etc. may be the center frequency candidates of Numerology 2. In this case, for example, when the terminal initially searches only the cell (or the carrier) having Numerology 2, the terminal only searches the candidate center frequencies having a 50 kHz offset and a 200 kHz spacing. In this case, the terminal may assume that Numerology 2 is applied to the entire or some region of the cell (or the carrier) of which the search is successful.

Meanwhile, in the case of the method M110, the graduations of the carrier raster for the numerologies may be defined to have an inclusion relationship to each other. This is referred to as a method M112.

For example, the carrier raster of Numerology 1 may have a 0 kHz offset and a 100 kHz spacing, and the carrier raster of Numerology 2 may have a 0 kHz offset and a 200 kHz spacing. In this case, the frequency such as 100 kHz, 300 kHz, 500 kHz, etc. may be the center frequency candidates of Numerology 1, and the frequency such as 200 kHz, 400 kHz, 600 kHz, etc. may be the center frequency candidates of Numerology 1 and Numerology 2.

When the terminal initially searches the cell (or the carrier) for the plurality of numerologies within any frequency band, the method M112 may reduce a number of the carrier raster graduation points to be searched by the terminal compared with the method M111. In this case, in the illustrations, when the terminal detects the cell in the frequency such as 200 kHz, 400 kHz, and 600 kHz, a method to distinguish whether the cell detected by the terminal is based on Numerology 1 or Numerology 2 is required. This will be described in detail in 'synchronization signal design' part later.

Meanwhile, in the case of the method M110, the method M111, or the method M112, the frequency spacing of the carrier raster for the numerology may be determined to be proportional to the subcarrier spacing of each numerology. This is referred to as a method M113. For example, when Numerology 1 and Numerology 2 have the subcarrier spacing of 15 kHz and 30 kHz, the carrier raster spacing of Numerology 2 may be two times the carrier raster spacing of Numerology 1. In this case, as a method defining the carrier raster spacing, the method M101 and the method M102 may be used.

Meanwhile, when $N_{RE}$ as the number of resource elements of one resource block in the frequency domain is the same for all numerologies, the method M113 may help to minimize the idle band between the carriers within the same band.

Figure 5:
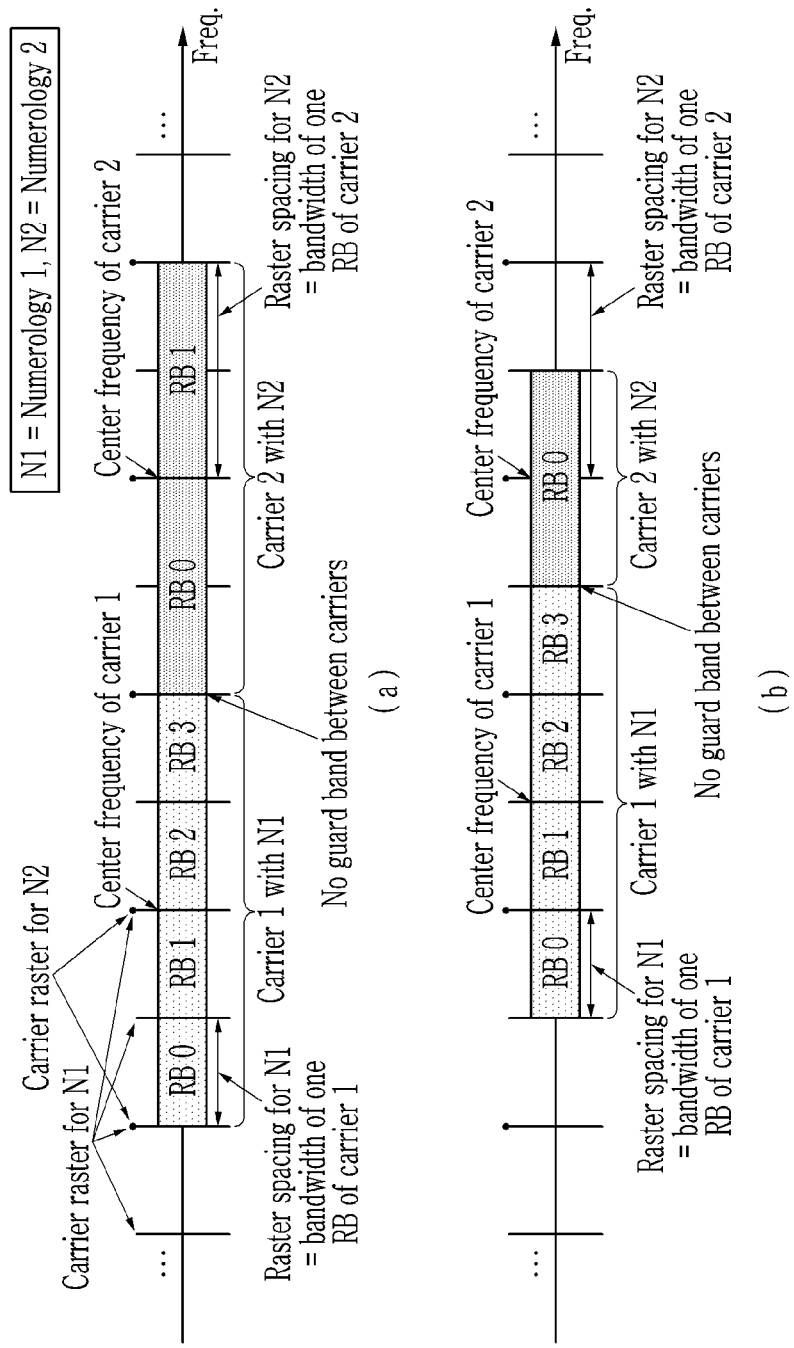
FIG. 5 is a view showing a carrier raster and a carrier allocation based on a method M112 or a method M113 according to an exemplary embodiment of the present invention.

FIG. 5 is a view showing a carrier raster and a carrier allocation based on a method M112 or a method M113 according to an exemplary embodiment of the present invention. In detail, in FIG. 5, it is assumed that the subcarrier spacing of Numerology 2 (N2) is two times the subcarrier spacing of Numerology 1 (N1).

The carrier raster for Numerology 1 (N1) includes the carrier raster for Numerology 2 (N2) by the method M112, and the carrier raster spacing for Numerology 2 (N2) is two times the carrier raster spacing for Numerology 1 (N1) by the method M113.

In this case, if it is assumed that $N_{RE}$ (the number of resource elements of one resource block in the frequency domain) is the same for Numerology 1 (N1) and Numerology 2 (N2), as illustrated in FIG. 5, the resource block of the carrier 2 (Carrier 2) occupies the bandwidth that is wider than the resource block of the carrier 1 (Carrier 1) by two times.

In FIG. 5, it is assumed that the method M101 is used to define the raster spacing. That is, the raster spacing of Numerology 1 (N1) is the same as the bandwidth occupied by one resource block of the carrier 1, and the raster spacing of Numerology 2 (N2) is the same as the bandwidth occupied by one resource block of the carrier 2.

As an effect for this, regardless of whether the number of the resource blocks of the carrier 2 is even (for example, (a) of FIG. 5) or odd (for example, (b) of FIG. 5), when the carrier 1 has the even number of resource blocks (RB0-RB3), the carrier allocation may be performed as there is no idle band (or guard band) between the carriers (Carrier 1, Carrier 2).

If the method M102 is used instead of the method M101, even if the carrier 1 has the odd number of resource blocks, the carrier allocation may also be performed as there is no idle band between the carriers. Instead, as the carrier raster spacing is reduced, the cell search complexity may increase.

Meanwhile, one carrier raster may be commonly defined for the plurality of numerologies. This is referred to as a method M120. For example, the carrier raster defined with reference to the numerology of the smallest subcarrier spacing within one frequency band may be used for the plurality of numerologies. In this case, because the terminal may need to perform the cell search for the plurality of numerologies for all carrier raster graduation points, the method M120 may increase the complexity compared with the method M112.

Meanwhile, the carrier raster may be defined for each frequency band. For example, it may be defined so that only numerology(ies) having the subcarrier spacing that is relatively large is used in the high frequency band. In this case, the carrier raster for the high frequency band may have the wider spacing than that of the carrier raster for the low frequency band.

[Synchronization Signal]

According to the above description, the terminal may need to assume the plurality of numerologies for one carrier raster graduation and the synchronization signal or the cell (or the carrier) thereof in the initial cell search process.

Hereinafter, a method of transmitting the synchronization signal for the initial cell search of the terminal through the base station in the case in which the plurality of numerologies are used within the common frequency range will be described.

Firstly, a case of the carrier configured of the single numerology is considered. In this case, the method M200 and the method M210 exist according to the relationship between the numerology of the synchronization signal and the numerology of the carrier.

The method M200 is a method in which the numerology applied to the synchronization signal follows the numerology of the carrier to which the synchronization signal belongs.

According to the method M200, because there is no interference between the synchronization signal and the signal of the adjacent frequency domain, the method M200 has a merit that it is not necessary to additionally set the guard band.

The terminal may attempt the detection of the synchronization signal by each numerology for the plurality of numerologies candidates. When the terminal has the successfully detected synchronization signal, the terminal may consider the numerology of the detected synchronization signal as the numerology of the carrier to which the detected synchronization signal belongs.

When the synchronization signal detection is performed in the time domain, the process thereof may be performed through the sampling, the filtering, and a correlator. Here, the filtering may be low-pass filtering when the synchronization signal is disposed to be symmetric with reference of the center frequency like the LTE. The correlator may be implemented with an auto-correlator, a self-correlator, or a cross-correlator according to the characteristic of the synchronization signal sequence.

As a sequence of the synchronization signal, a Zadoff-Chu sequence, a Gold sequence, and the like may be used. When the resource region of the synchronization signal is configured with a plurality of OFDM symbols, the sequence of the synchronization signal may be defined for each OFDM symbol and may be a long sequence occupying the plurality of OFDM symbols.

Hereinafter, the method M201 and the method M202 will be described as detailed methods of the method M200.

The method M201 is the method in which the time-frequency resource element configuration of the synchronization signal resource region is the same for the plurality of numerologies. That is, the method M201 is the method in which the resource element mapping of the synchronization signal is the same regardless of the numerology.

Figure 6:
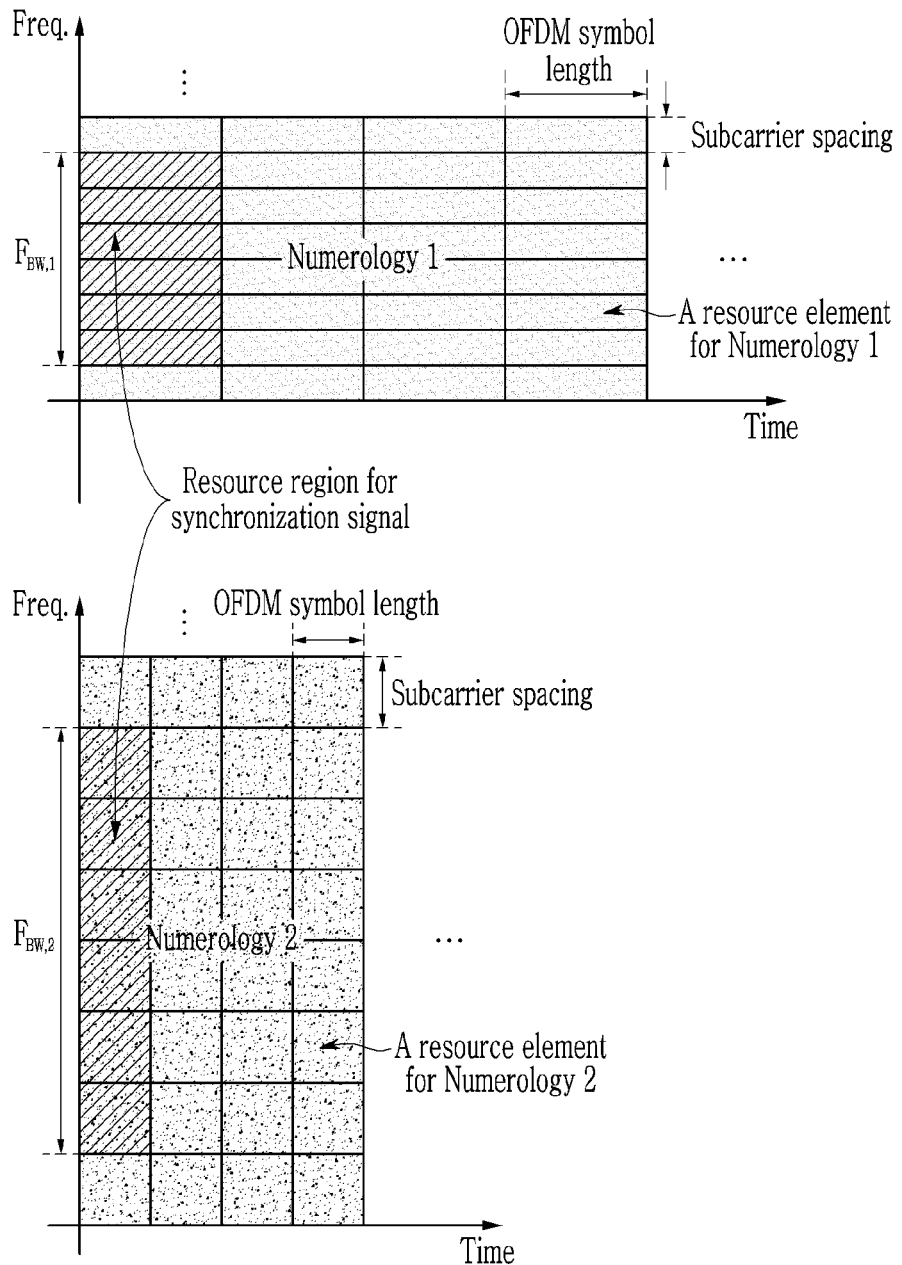
FIG. 6 is a view showing a synchronization signal resource region based on a method M201 according to an exemplary embodiment of the present invention.

FIG. 6 is a view showing a synchronization signal resource region based on a method M201 according to an exemplary embodiment of the present invention.

In detail, FIG. 6 illustrates a case in which the method M201 is applied to two numerologies (Numerology 1 and Numerology 2) that are different from each other. In FIG. 6, it is assumed that the sequence length of the synchronization signal is 6 and the subcarrier spacing of Numerology 2 is larger than the subcarrier spacing of Numerology 1.

According to the method M201, for both of Numerology 1 and Numerology 2, the resource region of the synchronization signal occupies one resource element (i.e., one OFDM symbol) in the time domain and occupies six continuous resource elements in the frequency domain.

$F_{BW,1}$ represents the bandwidth occupied by the synchronization signal applied with Numerology 1, and $F_{BW,2}$ represents the bandwidth occupied by the synchronization signal applied with Numerology 2. $F_{BW,2}$ is larger than $F_{BW,1}$.

In the case in which the method M201 is used, because the terminal needs to apply the different sampling, the different filtering, and/or the different correlator for each numerology, the complexity and the delay time for the initial cell search of the terminal may increase. Also, when the subcarrier spacing of the numerology is large, because the bandwidth used to the initial cell search increases, a required sampling rate may increase. For example, when the subcarrier spacing of the carrier is 60 kHz, the high sampling rate of four times may be required compared with the case in which the subcarrier spacing is 15 kHz. In contrast, since the period in which the synchronization signal is transmitted decreases as the subcarrier spacing increase, the method M201 may be advantageous to beam sweeping-based transmission in the high frequency band.

In the present specification, the resource region of the synchronization signal basically means a group of the resource elements in which the synchronization signal is mapped. Meanwhile, when the band pass filtering for the synchronization signal detection of the terminal is non-ideal, the guard band may need to be inserted at both ends of the bandwidth of the synchronization signal. For example, in the LTE, five adjacent subcarriers existing at both ends of the bandwidth of the PSS and the SSS are defined as the guard band. In this case, the resource region of the synchronization signal may mean the region including both the resource region where the synchronization signal is mapped and the guard band.

The method M202 is a method defining the bandwidth so that the bandwidth occupied by the synchronization signal resource region is the same or similar regardless of the numerology.

Figure 7:
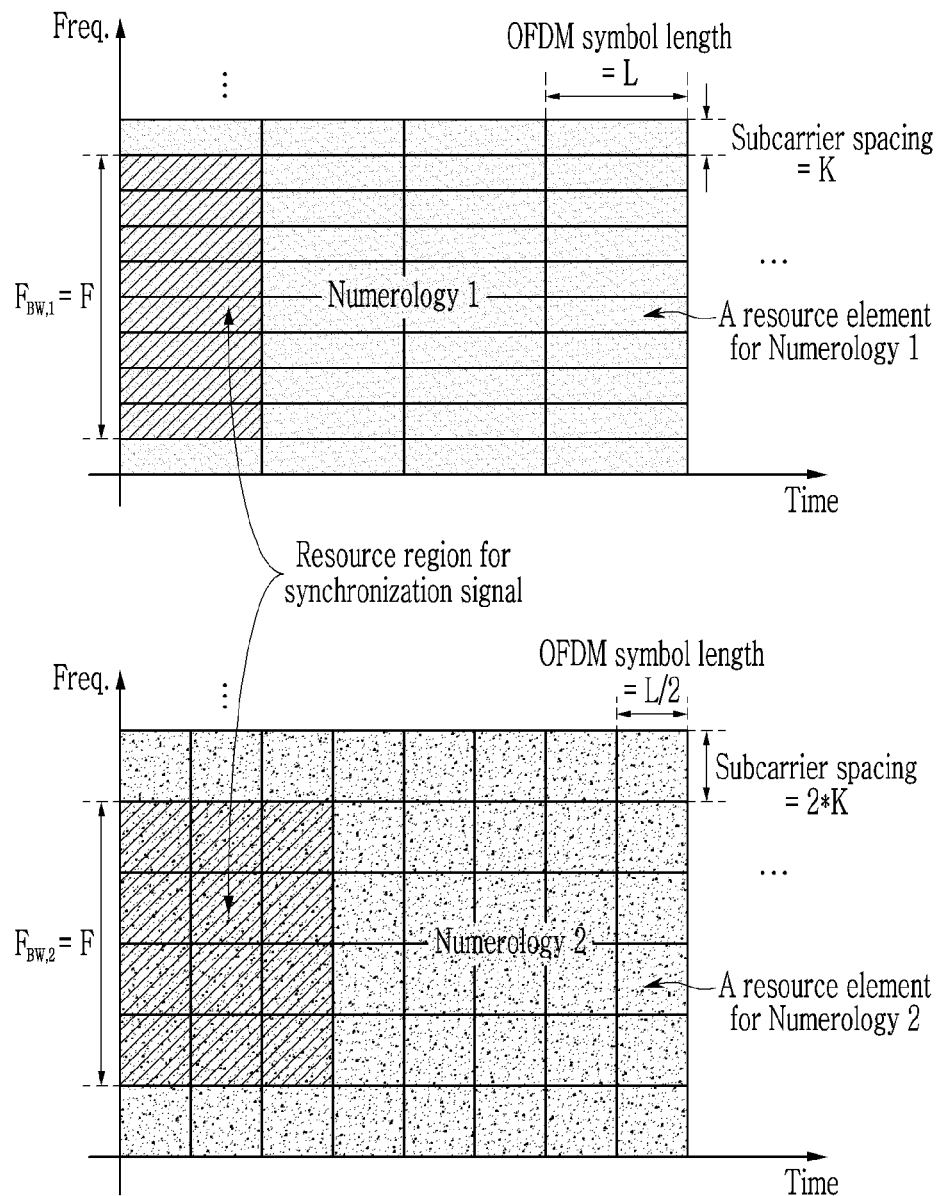
FIG. 7 is a view showing a numerology of a synchronization signal and a resource region of a synchronization signal based on a method M202 according to an exemplary embodiment of the present invention.

FIG. 7 is a view showing a numerology of a synchronization signal and a resource region of a synchronization signal based on a method M202 according to an exemplary embodiment of the present invention.

In detail, FIG. 7 illustrates a case in which the method M202 is applied to two different numerologies (Numerology 1 and Numerology 2). In FIG. 7, it is assumed that the subcarrier spacing (2*K) for Numerology 2 is two times the subcarrier spacing (K) for Numerology 1. That is, in FIG. 7, it is assumed that the OFDM symbol length L for Numerology 1 is two times the OFDM symbol length L/2 for Numerology 2.

In FIG. 7, it is assumed that the number of resource elements constituting the resource region of the synchronization signal is 8 in the case of Numerology 1 and 12 in the case of Numerology 2.

According to the method M202, the resource region of the synchronization signal includes eight resource elements in the frequency domain and one resource element in the time domain in the case of Numerology 1, and includes four resource elements in the frequency domain and three resource elements in the time domain in the case of Numerology 2. In this case, $F_{BW,1}$ and $F_{BW,2}$ of the bandwidth of the synchronization signal resource region are the same (i.e., $F_{BW,1}=F_{BW,2}=F$). Accordingly, the method M202 has the merit that the terminal may apply the same filtering to the plurality of numerologies in the initial cell search process. Also, the method M202 may transmit the synchronization signal to the narrow bandwidth regardless of the subcarrier spacing of the numerology. In contrast, in the method M202, since the number of the OFDM symbols occupied by the synchronization signal resource region may be different for each numerology, the sequence design considering this and the coexistence design with the other signals and channels considering this are required.

In the method M202, the fact that the bandwidths of the synchronization signal resource region are similar regardless of the numerologies may mean that the bandwidths are sufficiently similar (for example, within a few subcarriers difference) in applying the common filtering to the plurality of numerologies through the terminal.

Meanwhile, in the method M202, a method for performing the mapping may be considered so that the time duration is also the same or similar regardless of the numerology as well as the bandwidth of the synchronization signal resource region. This is referred to as a method M203.

Figure 8:
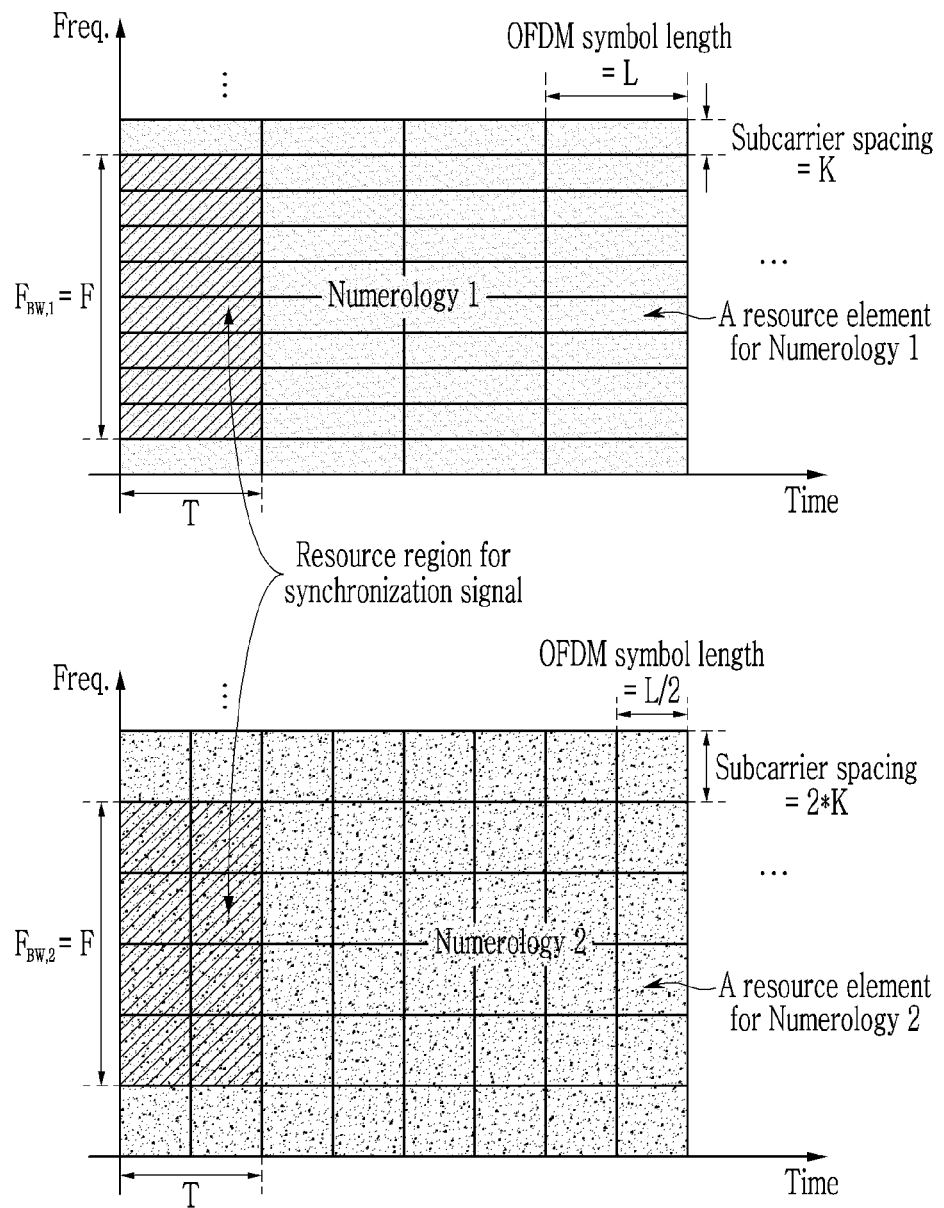
FIG. 8 is a view showing a numerology of a synchronization signal and a resource region of a synchronization signal based on a method M203 according to an exemplary embodiment of the present invention.

FIG. 8 is a view showing a numerology of a synchronization signal and a resource region of a synchronization signal based on a method M203 according to an exemplary embodiment of the present invention.

In detail, in FIG. 8, like the exemplary embodiment of FIG. 7, it is assumed that the subcarrier spacing (2*K) for Numerology 2 is two times the subcarrier spacing (K) for Numerology 1. That is, in FIG. 8, it is assumed that the OFDM symbol length L for Numerology 1 is two times the OFDM symbol length L/2 for Numerology 2.

In FIG. 8, it is assumed that the number of resource elements constituting the synchronization signal resource region is 8 in both the case of Numerology 1 and the case of Numerology 2.

According to the method M203, the resource region of the synchronization signal includes eight resource elements in the frequency domain and one resource element in the time domain in the case of Numerology 1, and includes four resource elements in the frequency domain and two resource elements in the time domain in the case of Numerology 2. That is, the bandwidth $F_{BW,1}$ occupied by the synchronization signal resource region for Numerology 1 and the bandwidth $F_{BW,2}$ occupied by the synchronization signal resource region for Numerology 2 are the same, and the time duration T occupied by the synchronization signal resource region for Numerology 1 and the time duration T occupied by the synchronization signal resource region for Numerology 2 are the same.

Also, in the method M202 or the method M203, the frequency resource region may be the same for the plurality of numerologies as well as the frequency bandwidth of the synchronization signal resource region. For example, the synchronization signal may occupy the bandwidth of $F_{BW,1}$ Hz or $F_{BW,2}$ Hz at the center of the system bandwidth regardless of the numerology.

The method M210 is a method in which the numerology applied to the synchronization signal is fixed regardless of the numerology of the carrier to which the synchronization signal belongs.

Figure 9:
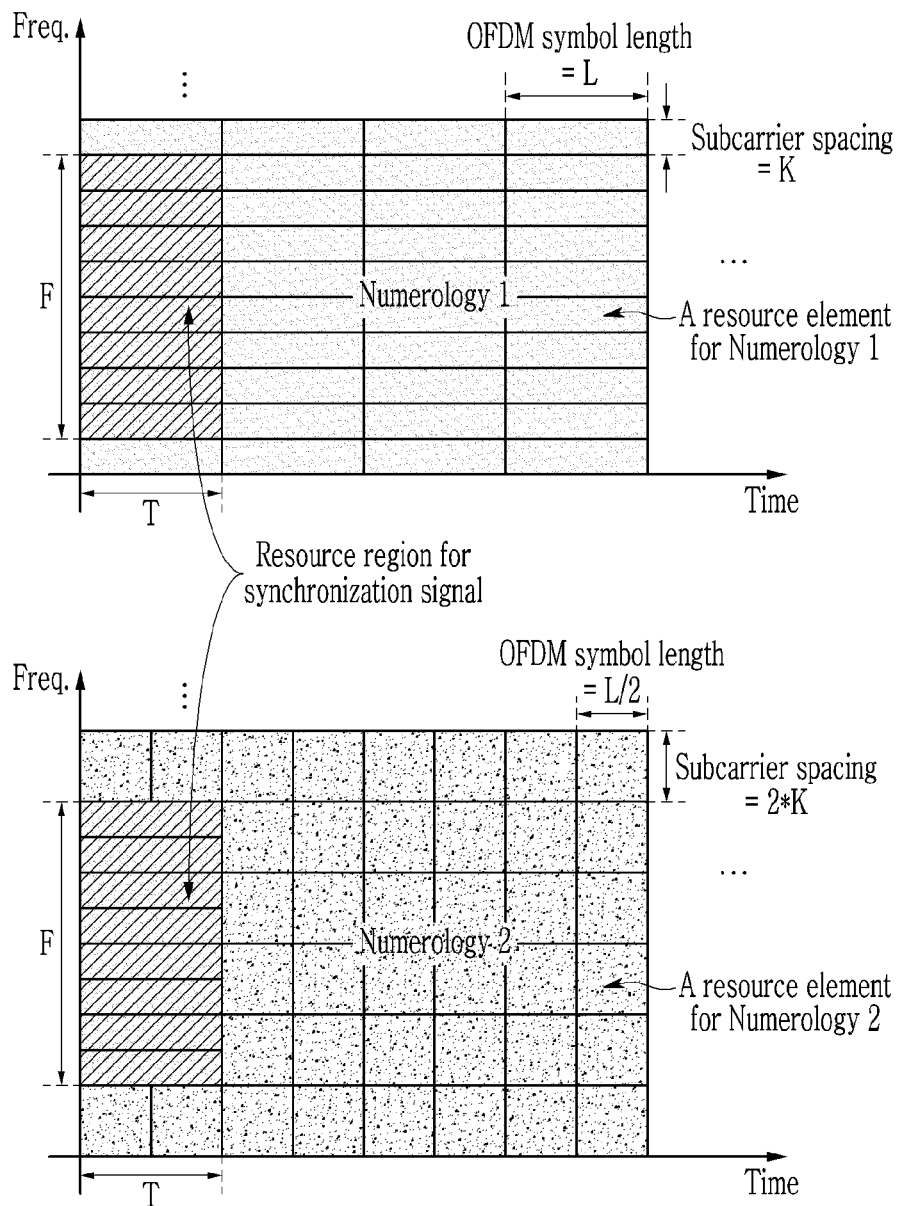
FIG. 9 is a view showing a numerology of a synchronization signal and a resource region of a synchronization signal based on a method M210 according to an exemplary embodiment of the present invention.

FIG. 9 is a view showing a numerology of a synchronization signal and a resource region of a synchronization signal based on a method M210 according to an exemplary embodiment of the present invention.

In detail, FIG. 9 illustrates a case in which the synchronization signal of the carrier applied with Numerology 1 and the synchronization signal of the carrier applied with Numerology 2 both follow Numerology 1. For example, in the case of Numerology 1, the resource region for the synchronization signal includes eight resource elements in the frequency domain and one resource element in the time domain. That is, the bandwidth F and the time duration T occupied by the synchronization signal resource region for Numerology 1 are the same as the bandwidth F and the time duration T occupied by the synchronization signal resource region for Numerology 2.

In FIG. 9, it is assumed that the subcarrier spacing (2*K) for Numerology 2 is two times the subcarrier spacing (K) for Numerology 1. That is, in FIG. 9, it is assumed that the OFDM symbol length L for Numerology 1 is two times the OFDM symbol length L/2 for Numerology 2.

The method M210 may be applied within a specific frequency range.

The method M210 may predetermine the numerology for the synchronization signal as one among the numerologies allowed within a specific frequency range. For example, the synchronization signal in the frequency band of 6 GHz or less may always be transmitted based on the numerology having the subcarrier spacing of 15 kHz.

According to the method M210, the terminal may search the synchronization signal through a single numerology in the initial cell search process.

However, since the numerology of the synchronization signal and the numerology of the carrier may be different, a separate method that is capable of determining which numerology the terminal applies to the carrier is required. The terminal may explicitly or implicitly acquire the numerology of the carrier through the synchronization signal reception. Also, the terminal may obtain the numerology of the carrier through the signal or the channel (for example, PBCH) received by the terminal after the synchronization signal. In this case, the signal or the channel received by the terminal after the synchronization signal follows the same numerology as the numerology of the synchronization signal. In the method M210, since the numerology of the signal and the channel adjacent to the synchronization signal in the frequency domain may be different from the numerology of the synchronization signal, an additional guard band may be inserted to both ends of the bandwidth of the synchronization signal.

Next, a case of the carrier configured with a plurality of numerologies is considered.

In one carrier, the plurality of numerologies may be multiplexed through the TDM (time division multiplexing), or may be multiplexed through the FDM (frequency division multiplexing) like the exemplary embodiment of FIG. 4. In this case, a method (hereinafter, 'method M220') in which a plurality of numerologies share one synchronization signal and a method (hereinafter, 'method M230') in which the synchronization signal is transmitted for each numerology may be used.

In the case in which the plurality of numerologies share one synchronization signal, like the method M200, the numerology of the synchronization signal may follow one among the plurality of numerologies within the carrier. This is referred to as a method M221. The method M221 will be described with reference to FIG. 10.

Figure 10:
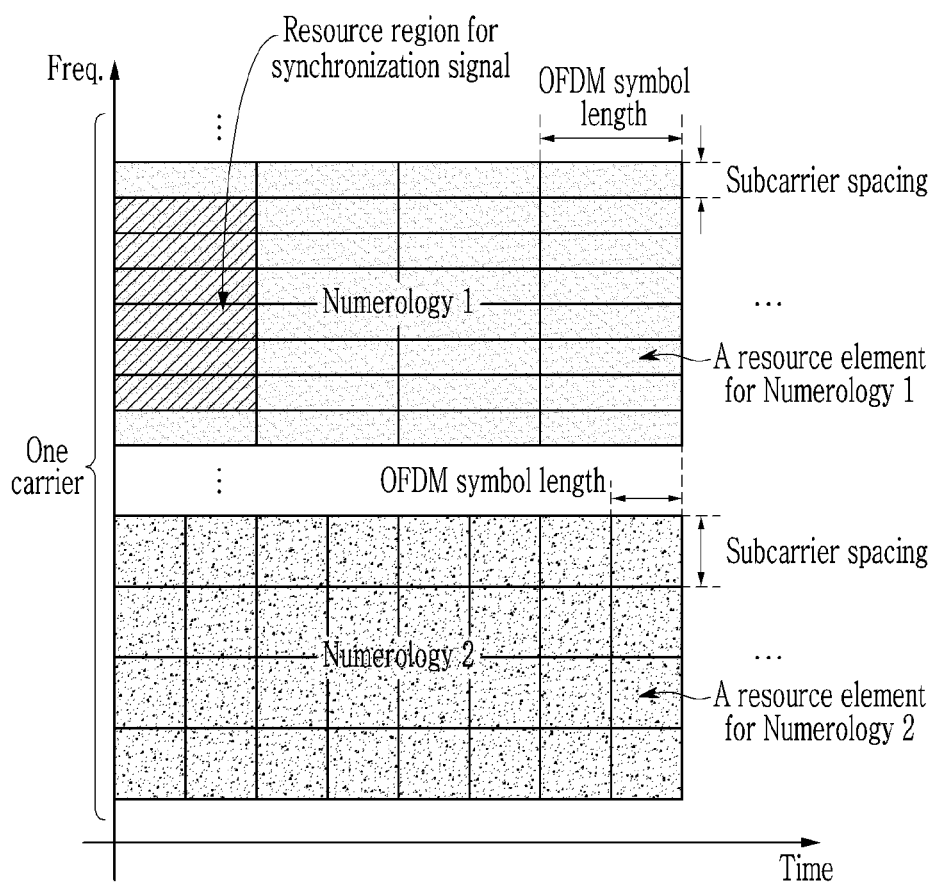
FIG. 10 is a view showing a numerology of a synchronization signal and a resource region of a synchronization signal for a carrier composed of a plurality of numerologies according to an exemplary embodiment of the present invention.

FIG. 10 is a view showing a numerology of a synchronization signal and a resource region of a synchronization signal for a carrier composed of a plurality of numerologies according to an exemplary embodiment of the present invention.

FIG. 10 illustrates a case in which two numerologies (Numerology 1, Numerology 2) are applied in one carrier.

In FIG. 10, it is assumed that the subcarrier spacing for Numerology 2 is larger than the subcarrier spacing for Numerology 1. That is, in FIG. 10, it is assumed that the OFDM symbol length for Numerology 1 is larger than the OFDM symbol length for Numerology 2.

As illustrated in FIG. 10, the synchronization signal resource region may be defined within the resource region to which the same numerology as the numerology (for example, Numerology 1) of the synchronization signal is applied. FIG. 10 illustrates the case in which the resource region for the synchronization signal includes six resource elements in the frequency domain and one resource element in the time domain.

The numerology of the synchronization signal may be used as the base numerology within one carrier. That is, the terminal accessed to the corresponding carrier may receive the signal by using the base numerology within the specific time-frequency resource region before separately configured with a numerology.

When only one synchronization signal exists in the carrier consisting of the plurality of numerologies, the synchronization signal may be defined at the center of the carrier bandwidth (for example, to be symmetrical based on the center frequency). In this case, when the plurality of numerologies are multiplexed through the FDM, the terminal may at least assume the same numerology as the numerology of the synchronization signal for the center bandwidth occupied with the synchronization signal.

As the resource region configuration method of the synchronization signal, the above-described methods (for example, the method M201, the method M202, the method M203, etc.) may be used.

Meanwhile, when the plurality of numerologies share one synchronization signal, like the method M210, the numerology of the synchronization signal may follow a predetermined numerology regardless of the numerologies of the carrier. This is referred to as a method M222.

When the synchronization signal is transmitted for each numerology within one carrier, the numerology of each synchronization signal may follow the numerology of the resource region in which the synchronization signal is defined. This is referred to as a method M231. The method M231 may be considered as the method M200 being applied within one carrier.

In this case, the configuration of the synchronization signal resource region may follow the above-described method (for example, the method M201, the method M202, the method M203, etc.).

Differently from the method M231, the numerology of all synchronization signals within one carrier may follow one among a plurality of numerologies constituting the carrier. This is referred to as a method M232.

Also, the numerology of all synchronization signals within one carrier may follow a predetermined numerology regardless of the numerology of the carrier. This is referred to as a method M233.

When the above-described methods are applied to a carrier consisting of a plurality of numerologies, a capability of the terminal may be considered.

When a NR terminal is basically capable of receiving a plurality of numerologies, the method M220 may be used. A terminal supporting the eMBB and the URLLC may correspond to this. In this case, the terminal may use the different numerologies from each other for the synchronization signal reception and the data reception.

In contrast, for the terminal without the capability of receiving the plurality of numerologies, the method M230 may be used. A low-cost terminal to support only a specific numerology for the mMTC transmission may correspond to this. In this case, the terminal uses the same numerology for the synchronization signal reception and the data reception.

Within one carrier, the method M220 and the method M230 may be combined and used.

In the above-described methods (for example, the method M200 to the method M233), transmission timing and the periodicity of the synchronization signal may be the same for a plurality of numerologies.

Meanwhile, since the length of the subframe and the group of the subframe numbers may be different from each other for the heterogeneous frame structure having the different numerologies, the transmission timing and the periodicity of the synchronization signal may be expressed by different equations for each frame structure.

When the transmission timing and the periodicity of the synchronization signal are the same, the initial cell search complexity of the terminal may be reduced.

Meanwhile, in the above-described methods, the different signals (or the different channels) may be mapped to the resource region of the synchronization signal. That is, within the synchronization signal resource region, the synchronization signal and the signal (or the channel) other than the synchronization signal may coexist. For example, when the synchronization signal is mapped to the non-continuous resource elements in the frequency domain, the resource elements to which the synchronization signal is not mapped may be used for the transmission of the other signals (or the channels).

The above-described synchronization signal may be limited to the usage searching the center frequency of the cell (or the carrier) in the initial cell search process of the terminal. In this case, in the frequency domain that does not support a standalone operation of the cell (or the carrier), the synchronization signal may not exist. Also, when the cell (or the carrier) is operated as an only secondary cell, the synchronization signal may not exist.

Meanwhile, the above-described synchronization signal may also be used for synchronization acquisition, synchronization tracking, and/or cell ID acquisition of the terminal as well as the center frequency search.

Also, the above-described synchronization signal may be used as a pilot for the channel estimation (or the data decoding).

Particularly, when the synchronization signal is used for other uses as well as the center frequency search, the synchronization signal may be configured with a plurality of synchronization signals. For example, the synchronization signal may be configured with a first synchronization signal and a second synchronization signal. When the synchronization signal is configured with a plurality of synchronization signals, the above-described methods (for example, the method M200 to the method M210) may only be applied to some of synchronization signals (for example, the first synchronization signal). Also, the above-described methods (for example, the method M200 to the method M210) may be applied to the plurality of synchronization signals (for example, the first synchronization signal, the second synchronization signal). In this case, the synchronization signal resource region defined for the above-described methods (for example, the method M200 to the method M210) may include only some of synchronization signals in the former case and may include the plurality of synchronization signals in the latter case.

[Signal Composition for Initial Access]

Since the NR supports the wide range of frequency, the operation of the high frequency band and the operation of the low frequency band may be different from each other.

In the high frequency band in which a path loss of the signal is large, transmit beamforming and/or receive beamforming may be applied. For a coverage extension of the cell or the terminal, a beamforming may also be applied to the common signal and the control channel as well as the data channel. In this case, when a beam having a small beamwidth is formed through a plurality of antennas, to cover the entire coverage of the cell or the sector, the signal may need to be received or transmitted several times through the beams having a plurality of different direction directivities. To transmit the signal applied with the beamforming through the different resources from each other in the time domain is referred to as beam sweeping.

In contrast, in the low frequency band in which the path loss of the signal is relatively small, even if the common signal and the control channel are transmitted one time, the entire coverage of the cell or the sector may be covered.

The initial access procedure of the NR must support all the above-different beam operations.

Hereinafter, the resource composition and the transmission method for the signals for the initial access of the terminal will be described. A method (a band-agnostic or beam operation-agnostic method) that may be commonly used regardless of the frequency band or the beam operation will be described.

For the initial access of the terminal, a downlink discovery signal and an uplink PRACH may be used.

First, the downlink discovery signal will be described.

The discovery signal may be the downlink signal for the cell search, system information acquisition, beam acquisition and tracking, and so on of the terminal, and may be periodically transmitted to the terminal. A discovery signal occasion may be defined.

Figure 11:
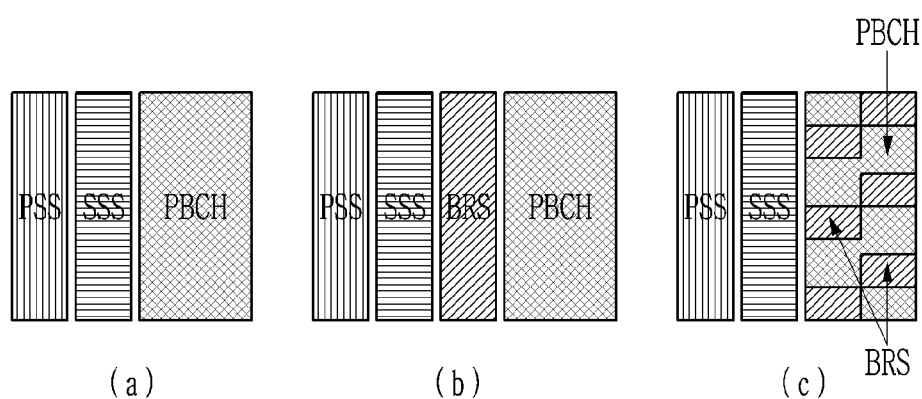
FIG. 11 is a view showing a constituent element of a discovery signal according to an exemplary embodiment of the present invention.

FIG. 11 is a view showing a constituent element of a discovery signal according to an exemplary embodiment of the present invention.

The discovery signal occasion may consist of the synchronization signal and the PBCH, as illustrated in (a) of FIG. 11.

The synchronization signal may be used for the time-frequency synchronization, the cell ID acquisition, etc., and the PBCH may be used to transmit system information (SI) that is essential for the initial access. A cell (or a base station) that does not support the initial access may not transmit the PBCH. That is, the discovery signal occasion may not include the PBCH.

The synchronization signal may be composed of a plurality of synchronization signals. For example, the synchronization signal may consist of a primary synchronization signal (PSS) and a secondary synchronization signal (SSS).

Also, as illustrated in (b) of FIG. 11 or (c) of FIG. 11, the discovery signal occasion may consist of the synchronization signal, PBCH, and a beam reference signal (BRS).

The BRS may be used for beam or beam ID acquisition, RRM (radio resource management) measurement, and/or PBCH decoding. The TDM may be applied between the PBCH and the BRS. Also, for better PBCH decoding performance, as illustrated in (c) of FIG. 11, the PBCH and the BRS may coexist in a common region.

Also, the discovery signal occasion may include the reference signal for CSI (channel state information) measurement and reporting, that is, a CSI-RS (reference signal). The discovery signal occasion may also include a separate reference signal for the beam tracking. The CSI-RS and/or the beam tracking reference signal may be set to be terminal specific (UE-specific).

When the discovery signal occasion is used for the initial cell search of the terminal, a transmission periodicity and an offset of the discovery signal occasion may be a fixed value that is predefined.

It is assumed that M time-frequency resources exist for each of the synchronization signal, the PBCH, and/or the BRS within one discovery signal occasion periodicity. Here, M is a natural number. That is, the element signals included in the discovery signal occasion may respectively use the M resources. The M resources for each element signal have the same bandwidth and the same time duration (for example, the same number of OFDM symbols).

In a case of M>1, the beam sweeping may be applied to each of the synchronization signal, the PBCH, and/or the BRS through the plurality of resources. In a case of M=1, a single beam may be transmitted or a plurality of beams may be transmitted through SDM (spatial division multiplexing) on the same resource.

The discovery signal occasion may consist of a plurality of signal blocks. The resource occupied by one signal block is continuous in the time and frequency domains. That is, the resource occupied by one signal block may include time domain symbols that are continuous in the time domain. In this case, a method M300 and a method M310 may be considered according to the element signal constituting the signal blocks.

The method M300 is a method in which the discovery signal occasion consists of the heterogeneous signal blocks. That is, the discovery signal occasion may consist of the synchronization signal block(s) and the PBCH block. In this case, when the BRS exists for the decoding of the PBCH, the BRS may be included in the PBCH block.

Figure 12:
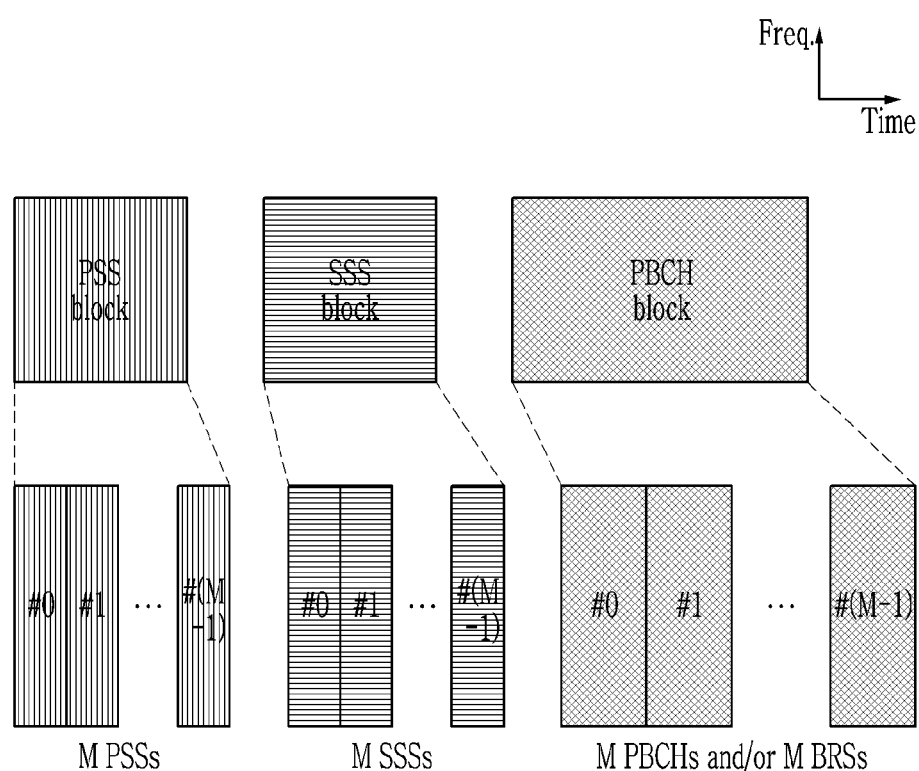
FIG. 12 is a view showing a resource configuration of a discovery signal occasion based on a method M300 according to an exemplary embodiment of the present invention.

FIG. 12 is a view showing a resource configuration of a discovery signal occasion based on a method M300 according to an exemplary embodiment of the present invention.

In detail, FIG. 12 illustrates a case in which the discovery signal occasion consists of three heterogeneous signal blocks (a first signal block, a second signal block, and a third signal block).

The first signal block is the PSS block, and includes M PSS resources classified through the TDM. The second signal block is the SSS block and includes M SSS resources classified through the TDM. The third signal block is the PBCH block and includes M PBCH resources and/or M BRS resources classified through the TDM.

As another example, the discovery signal occasion may be configured of two heterogeneous signal blocks (a first signal block and a second signal block). The first signal block is the PSS and the SSS block and includes the M PSS resources and the M SSS resources classified through the TDM. The second signal block is the PBCH block and includes the M PBCH resources and/or the M BRS resources classified through the TDM. In this case, the PSS resources and the SSS resources may be arranged to be crossed in the order of {PSS #0, SSS #0, PSS #1, SSS #1, . . . , PSS # M−1, SSS # M−1} in the time domain within the first signal block.

The method M310 is a method in which the discovery signal occasion consists of the homogeneous signal block(s), that is, the discovery signal block(s). The method M310 will be described with reference to FIG. 13.

Figure 13:
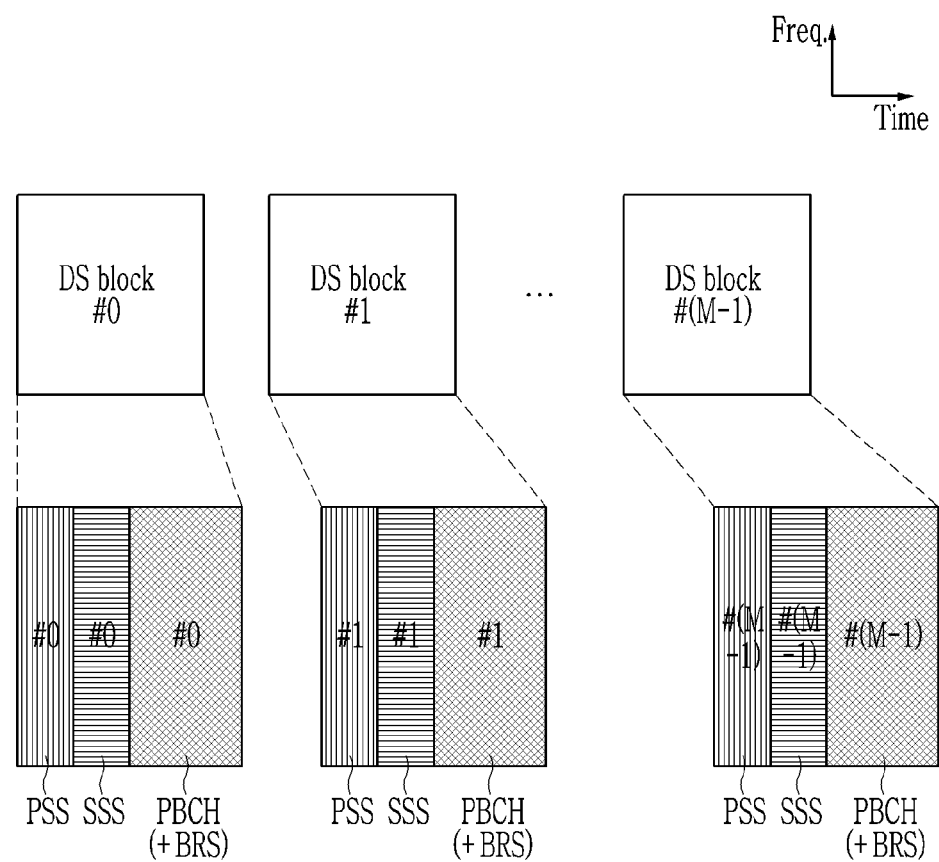
FIG. 13 is a view showing a resource composition of a discovery signal occasion based on a method M310 according to an exemplary embodiment of the present invention.

FIG. 13 is a view showing a resource composition of a discovery signal occasion based on a method M310 according to an exemplary embodiment of the present invention. In FIG. 13 to FIG. 18, DS means the discovery signal.

The discovery signal occasion consists of the M discovery signal block(s), and one discovery signal block includes one synchronization signal resource, one PBCH resource, and/or one BRS resource.

FIG. 13 illustrates a case in which the synchronization signal consists of the PSS and the SSS and the TDM is applied between the PSS resource, the SSS resource, and the PBCH resource within each discovery signal block. One synchronization signal resource included in one discovery signal block is classified into the PSS resource and the SSS resource.

When the terminal firstly receives the PSS and then receives the SSS next, it is advantageous that the PSS is transmitted earlier than the SSS in time within one discovery signal block.

Meanwhile, in the method M300 and the method M310, the TDM and/or the FDM may be applied between the signal blocks.

Figure 14:
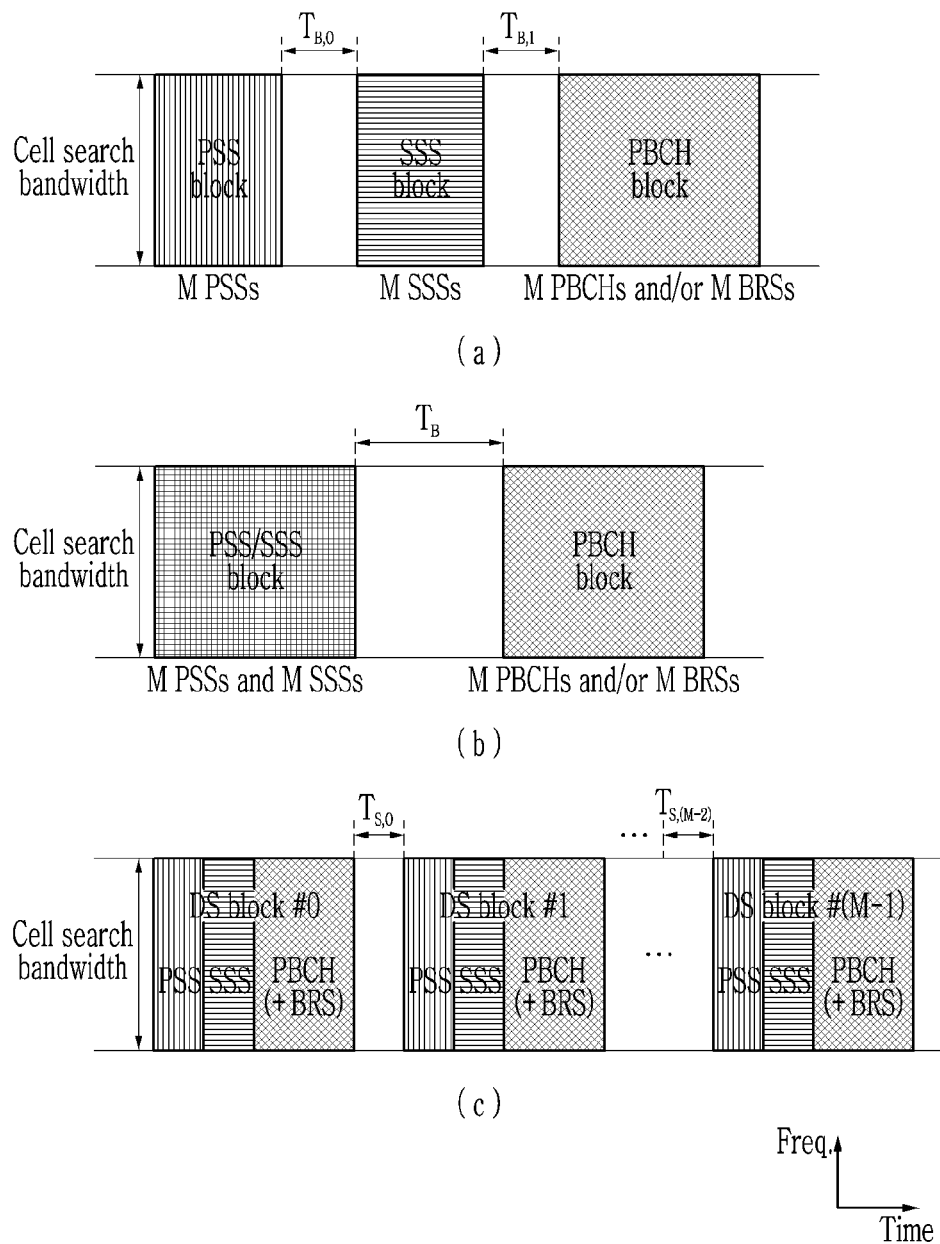
FIG. 14 is a view showing a case in which a TDM is applied between signal blocks in a method M300 or a method M310 according to an exemplary embodiment of the present invention.

FIG. 14 is a view showing a case in which a TDM is applied between signal blocks in a method M300 or a method M310 according to an exemplary embodiment of the present invention.

When the discovery signal occasion occupies only one sub-band, the TDM may be applied between the signal blocks. This case is illustrated in (a) of FIG. 14, (b) of FIG. 14, and (c) of FIG. 14. When the discovery signal occasion occupies the plurality of sub-bands, both the TDM and the FDM may be applied among the signal blocks.

(a) of FIG. 14 and (b) of FIG. 14 represent an exemplary embodiment of the method M300, and (c) of FIG. 14 represents an exemplary embodiment of the method M310.

In (a) of FIG. 14, a time distance between the PSS block (including the M PSS resources) and the SSS block (including the M SSS resources) is $T_{B,0}$, and the time distance between the SSS block and the PBCH block (including the M PBCH resources and/or the M BRS resources) is $T_{B,1}$.

In (b) of FIG. 14, the time distance between the PSS/SSS block (including the M PSS resources and the M SSS resources) and the PBCH block (including the M PBCH resources and/or the M BRS resources) is $T_B$.

In (c) of FIG. 14, the time distance between the M discovery signal blocks is $T_{S,0}, T_{S,1}, \ldots, T_{S,(M-2)}$. Each discovery signal block includes one synchronization signal resource (the PSS resource, the SSS resource), one PBCH resource, and/or one BRS resource.

The bandwidth(s) of the sub-bands occupied by one discovery signal occasion may all be the same. This bandwidth is referred to as cell search bandwidth.

When the guard band is inserted at both ends of the bandwidth of the synchronization signal, the synchronization signal bandwidth including the guard band may be the same as the PBCH bandwidth.

The method M310 has some merits compared with the method M300.

First, because the channel variation is relatively small within one discovery signal block, when the antenna port of the PSS/SSS and the antenna port of the PBCH are the same, the PSS/SSS may help the decoding of the PBCH or the BRS-based RRM measurement.

Secondly, because the method M300 must perform the beam sweeping for each signal block in the case of M>1, fast beamforming change is required. However, because the method M310 may change the beamforming across the discovery signal blocks and may apply the same or similar beam within a discovery signal block, the beamforming change may less frequently occur.

Finally, according to the method M300, a relative distance (for example, the time domain distance and the frequency domain distance) among the m-th PSS resource, the m-th SSS resource, and the m-th PBCH resource may be changed depending on a beamforming mode, that is, the value of M. Here, m is a resource index and is an integer greater than or equal to 0 and less than or equal to M−1. Accordingly, after the terminal receives the PSS, resource position information of the SSS or the PBCH may need to be provided from the base station to receive the SSS or the PBCH. For example, the terminal may also need to obtain the value of M through the PSS reception to know the resource position of the SSS or the PBCH.

In contrast, according to the method M310, the relative distance (for example, the time domain distance and the frequency domain distance) between the m-th PSS resource, the m-th SSS resource, and the m-th PBCH resource is constant regardless of the value of M. In the present specification, the frequency domain distance between the resources means the relative distance between the frequency regions occupied by the resources. This may be applied to a case in which the frequency resources overlap with each other in the frequency domain. For example, the time and the frequency distances between the PSS (or the PSS resource) and the SSS (or the SSS resource) included in the m-th discovery signal block generated by the base station are the same as the time and frequency distances between the PSS (or the PSS resource) and the SSS (or the SSS resource) included in the (m+1)-th discovery signal block generated in the base station. That is, the time domain distance between the PSS resource and the SSS resource included in the m-th discovery signal block is the same as the time domain distance between the PSS resource and the SSS resource included in the (m+1)-th discovery signal block, and the frequency domain distance between the PSS resource and the SSS resource included in the m-th discovery signal block is the same as the frequency domain distance between the PSS resource and the SSS resource included in the (m+1)-th discovery signal block. Likewise, the time and frequency distances between the SSS (or the SSS resource) and the PBCH (or the PBCH resource) included in the m-th discovery signal block are the same as the time and frequency distances between the SSS (or the SSS resource) and the PBCH (or the PBCH resource) included in the (m+1)-th discovery signal block. Likewise, the time and frequency distances between the PSS (or the PSS resource) and the PBCH (or the PBCH resource) included in the m-th discovery signal block are the same as the time and frequency distances between the PSS (or the PSS resource) and the PBCH (or the PBCH resource) included in the (m+1)-th discovery signal block.

Accordingly, after detecting the PSS, the terminal may receive the SSS or the PBCH at the position determined within the discovery signal block (for example, the m-th discovery signal block) including the PSS resource (for example, the m-th PSS resource) in which the PSS is detected. That is, the terminal does not need to know the resource of all signal blocks constituting the discovery signal occasion, and it is sufficient to assume that one discovery signal block including the PSS resource of which the PSS is detected is transmitted. Therefore, according to the method M310, the terminal does not need to know the beamforming mode, that is, the value of M in the discovery signal receiving process for the initial cell search.

Meanwhile, the terminal may assume (or determine) a discovery signal measurement window (DMW) to receive the discovery signal occasion.

Figure 15:
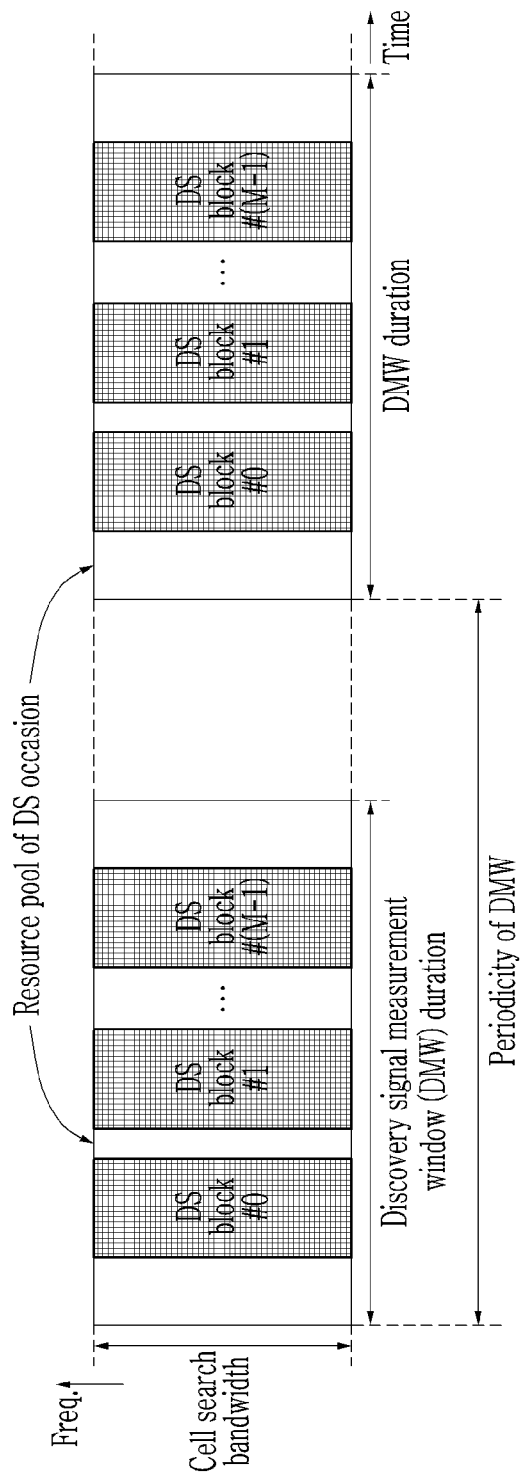
FIG. 15 is a view showing a case in which a discovery signal occasion is transmitted in a discovery signal measurement window according to an exemplary embodiment of the present invention.

FIG. 15 is a view showing a case in which a discovery signal occasion is transmitted in a discovery signal measurement window according to an exemplary embodiment of the present invention.

In FIG. 15, it is assumed that the TDM is applied between the M discovery signal blocks.

The terminal may monitor, find, and measure the discovery signal within the discovery signal measurement window.

When the method M310 is applied to the resource composition of the discovery signal occasion and the PSS, the SSS, and the PBCH as the element signal are included in the discovery signal occasion, the terminal may monitor the PSS within the discovery signal measurement window.

In this case, the terminal may find one or more PSS beam transmitted from the same cell. When the terminal finds at least one PSS corresponding to at least one discovery signal block within the discovery signal measurement window, one among at least one PSS may be selected.

To select one among at least one found PSS beam, after the terminal monitors the entire time duration of the discovery signal measurement window, a method (hereinafter, 'a first selection method') of selecting the PSS beam (or the PSS resource corresponding to the PSS beam) of which the reception performance is the best among the found PSS beam(s) may be used. Also, to select one among at least one found PSS beam, a method (hereinafter, 'a second selection method') performing the monitoring until the terminal finds one PSS beam (or the PSS resource corresponding to the PSS beam) satisfying a predetermined reception performance condition may be used. The first selection method provides higher reception performance compared with the second selection method, however discovery signal receiving complexity of the terminal may increase.

Also, the terminal may monitor the SSS or the PBCH at the position determined within the discovery signal block (for example, the m-th discovery signal block) corresponding to the PSS (for example, the PSS having the best reception performance or satisfying the predefined reception performance condition) selected by the first selection method or the second selection method.

On the other hand, FIG. 15 illustrates a case in which the discovery signal measurement window is continuously predetermined in the time-frequency domain within one DMW periodicity.

However, the discovery signal measurement window may also be discontinuous in the time or frequency domain. That is, a plurality of resource blocks may constitute the discovery signal measurement window in the time domain or the frequency domain within one discovery signal measurement window periodicity. In this case, each resource block may mean a group of the continuous resources in the time domain and the frequency domain, and the resource blocks may not be adjacent in the time domain and/or the frequency domain.

The terminal that is not connected by RRC (radio resource control) may assume the discovery signal measurement window information (for example, a DMW duration and a DMW periodicity) as a predetermined value. That is, the terminal that is not connected to the base station by the RRC may determine the duration and the periodicity for the discovery signal measurement window based on the predefined duration value and periodicity value. For example, the discovery signal measurement window periodicity for the terminal attempting the initial access may be defined as 5 ms like the LTE, and the discovery signal measurement window duration for the terminal may be defined as a fixed value of less than 5 ms. When the duration and the periodicity of the discovery signal measurement window are the same, the terminal that is not connected by the RRC may monitor the discovery signal in the whole time instances.

Meanwhile, the RRC-connected terminal (or the terminal that is not connected by the RRC but may be able to receive system information from the base station) may receive the configuration of the discovery signal measurement window information (for example, the DMW duration and the DMW periodicity) from the base station. In this case, to decrease the receiving complexity of the terminal, the discovery signal measurement window periodicity may be set to be longer than the value assumed by the terminal that is not connected by the RRC, and the discovery signal measurement window duration may be set to be shorter than the value assumed by the terminal that is not connected by the RRC. For example, the periodicity and the duration of the discovery signal measurement window may be set as 40 ms and 2 ms, respectively. That is, the base station may set the DMW periodicity for the terminal that is connected to the base station by the RRC as the value that is larger than the periodicity value that is predetermined for the terminal that is not connected to the base station by the RRC. Also, the base station may set the DMW duration for the terminal that is connected to the base station by the RRC as the value that is smaller than the duration value that is predetermined for the terminal that is not connected to the base station by the RRC.

When the RRC-connected terminal does not receive the configuration of the discovery signal measurement window information (for example, the DMW duration and the DMW periodicity) from the base station, the RRC-connected terminal may not perform the discovery signal measurement. That is, the discovery signal measurement window information (for example, the DMW duration and the DMW periodicity) may be set to the terminal only when the terminal discovery signal measurement is necessary. Also, in this case, the RRC-connected terminal may assume the discovery signal measurement window information (for example, the DMW duration and the DMW periodicity) as the same value as the value assumed by the terminal that is not connected by the RRC.

The discovery signal measurement window information (for example, the DMW duration and the DMW periodicity) may be signaled as terminal specific (UE-specific).

FIG. 15 illustrates a case in which all signals (for example, the M discovery signal blocks) constituting the discovery signal occasion are transmitted by the base station within the discovery signal measurement window. In contrast, in the terminal specific discovery signal measurement window, only a part (for example, one or a plurality of discovery signal blocks) of the signals constituting the discovery signal occasion may be transmitted. Also, within the discovery signal measurement window, no signal constituting the discovery signal occasion may be transmitted.

Meanwhile, a resource pool (hereinafter, 'a discovery signal resource pool') to transmit the discovery signal occasion may be defined. That is, the discovery signal occasion may be transmitted within a predefined discovery signal resource pool. In this case, the periodicity of the discovery signal occasion may not be separately defined, and the periodicity of the discovery signal resource pool may be vicariously defined.

The base station may allocate a part or all of the resources belonging to the discovery signal resource pool predefined for the transmission of the discovery signal to at least one discovery signal block. FIG. 15 illustrates a case in which the base station allocates a part of the resources belonging to the discovery signal resource pool to the M discovery signal blocks constituting the discovery signal occasion.

FIG. 15 illustrates a case in which the region of the discovery signal resource pool is identical to the region of the discovery signal measurement window. However, the region of the discovery signal resource pool and the region of the discovery signal measurement window may not be identical.

Hereinafter, the relationship between the discovery signal and the PRACH will be described.

In the NR system, like the LTE, the PRACH may be used for the random access of the terminal or the terminal discovery of the base station.

The terminal may transmit the preamble or encoded signal through the PRACH. In detail, the operation related to the PRACH resource configuration method for the case using the method M310 will be described. For this, the PRACH occasion may be defined.

Like the composition of the discovery signal occasion with the M discovery signal blocks in the method M310, the PRACH occasion may be composed of M PRACH blocks (or PRACH resources) (only m=0, 1, . . . , M−1) within one PRACH occasion periodicity for the receive beamforming of the base station. The resources occupied by one PRACH block are continuous in the time-frequency domain.

Figure 16:
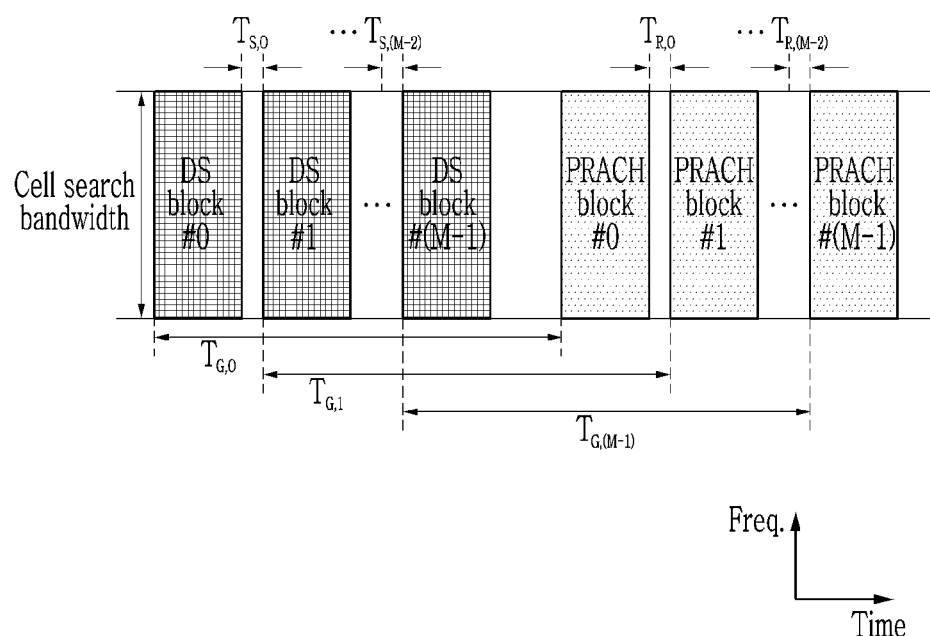
FIG. 16 is a view showing a discovery signal and a PRACH resource composition based on a method M310 according to an exemplary embodiment of the present invention.

FIG. 16 is a view showing a discovery signal and a PRACH resource composition based on a method M310 according to an exemplary embodiment of the present invention.

In detail, FIG. 16, as an exemplary embodiment of the resource composition of the PRACH occasion, the M discovery signal blocks and the M PRACH blocks for the PRACH reception of the base station exist within one cell search bandwidth.

In FIG. 16, $T_{S,m}$ (for example, $T_{S,0}$, $T_{S,1}$, . . . , $T_{S,(M-2)}$) represents the time domain distance between the m-th discovery signal block and the (m+1)-th discovery signal block, $T_{R,m}$ (for example, $T_{R,0}$, $T_{R,1}$, . . . , $T_{R,(M-2)}$) represents the time domain distance between the m-th PRACH block and the (m+1)-th PRACH block, and $T_{G,m}$ (for example, $T_{G,0}$, $T_{G,1}$, . . . , $T_{G,(M-1)}$) represents the time domain distance between the m-th discovery signal block and the m-th PRACH block. However, the exemplary embodiment of FIG. 16 is only one example, and a case in which the signal blocks are mapped to the different frequency resources from each other may be considered.

The base station attempts the PRACH reception in all M PRACH blocks. In this case, the base station may derive the receiving beam for the m-th PRACH block based on the transmission beam for the m-th discovery signal block among the M discovery signal blocks. When reciprocity is established between the uplink channel and the downlink channel like the TDD, the transmission beam and the receiving beam may be the same or similar.

When the terminal succeeds in the detection of the synchronization signal and/or the BRS in the m-th discovery signal block, the terminal transmits the preamble in the m-th PRACH block. This terminal operation is referred to as a method M311. If the terminal also performs the beamforming, like the base station, the terminal may derive the transmission beam of the m-th PRACH block based on the receiving beam of the m-th discovery signal block. According to the method M310 and the method M311, the terminal only needs to know the resource position of the m-th PRACH block among the M PRACH blocks.

The resource position of the m-th PRACH block may be expressed by a time offset and a frequency offset from the resource of the m-th discovery signal block. In the exemplary embodiment of FIG. 16, because the frequency offset is 0, the resource position of the m-th PRACH block may be expressed by only the time offset $T_{G,m}$.

In this case, the time offset $\{T_{G,m}\}$ may be defined to have the same value $T_G$ for all m (where m=0, 1, . . . , M−1). This is referred to as a method M320. In contrast, the time offset $\{T_{G,m}\}$ may be allowed to have different values according to m. This is referred to as a method M321.

In the case of the method M320, the value of $T_G$ may be predefined in the technical specification or may be transmitted to the terminal by the discovery signal. In the case of the method M321, the value of $T_{G,m}$ may be transmitted to the terminal by the m-th discovery signal block. Although the method M321 has a burden of informing the resource configuration information of the PRACH block to the terminal, the method M321 has high flexibility of resource configuration compared with the method M320.

When the frequency offset exists between the PRACH block and the discovery signal block, the above-described methods may also be similarly applied to the frequency offset.

Meanwhile, $\{T_{S,m}\}$ and $\{T_{R,m}\}$ may be previously defined in the technical specification. This is referred to as a method M330. For example, $T_{S,0}=T_{S,1}= \ldots =T_{S,(M-2)}=T_S$, $T_{R,0}=T_{R,1}= \ldots =T_{R,(M-2)}=T_R$, and $T_S$, and $T_R$ may have the fixed values. As the values of $T_S$ and $T_R$ decrease, the time required for the beam sweeping may decrease. That is, the time distance between the m-th discovery signal block and the (m+1)-th discovery signal block is determined based on the predefined $T_S$ value, and the time distance between the m-th PRACH block and the (m+1)-th PRACH block is determined based on the predefined $T_R$ value.

Figure 17:
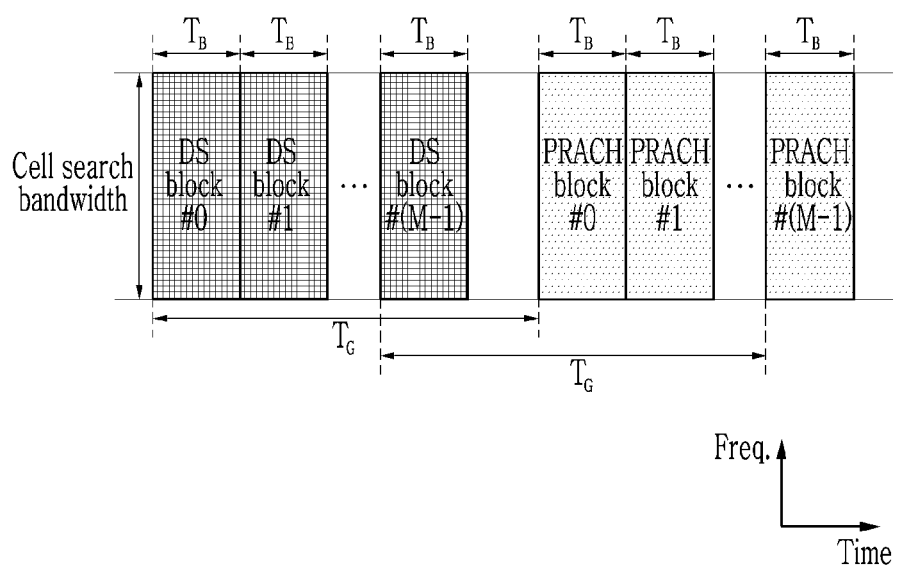
FIG. 17 is a view showing a discovery signal and a PRACH resource composition based on a method M320 and a method M330 according to an exemplary embodiment of the present invention.

FIG. 17 is a view showing a discovery signal and a PRACH resource composition based on a method M320 and a method M330 according to an exemplary embodiment of the present invention.

FIG. 17 illustrates a case of $(T_S, T_R)=(0, 0)$ as the exemplary embodiment of the method M330. That is, the time domain distance between the m-th discovery signal block and the (m+1)-th discovery signal block is 0, and the time domain distance between the m-th PRACH block and the (m+1)-th PRACH block is 0.

Also, FIG. 17 as the exemplary embodiment of the method M320 illustrates a case in which the time offsets $\{T_{G,m}\}$ between the discovery signal block and the PRACH block are all the same. That is, the time domain distance between the m-th discovery signal block and the m-th PRACH block is $T_G$.

For this, the time duration of each discovery signal block and the time duration of each PRACH block may be designed to be the same as $T_B$.

In contrast, $\{T_{S,m}\}$ and $\{T_{R,m}\}$ may not be defined in the technical specification, but the base station may arbitrarily determine the $\{T_{S,m}\}$ and $\{T_{R,m}\}$ values. This is referred to as a method M331. For example, the base station may determine the time distance between the m-th discovery signal block and the (m+1)-th discovery signal block based on traffic conditions. Accordingly, the base station may dynamically adjust a DL part and a UL part. Also, the base station may arbitrarily determine the time distance between the m-th PRACH block and the (m+1)-th PRACH block. In the method M331, the time distance between the m-th discovery signal block and the (m+1)-th discovery signal block may be generally expressed as an integer number of OFDM symbols. If it is assumed that the number of OFDM symbols constituting a discovery signal block is $N_{DS}$, the time distance between the m-th discovery signal block and the (m+1)-th discovery signal block may be an integer multiple of $N_{DS}$.

Figure 18:
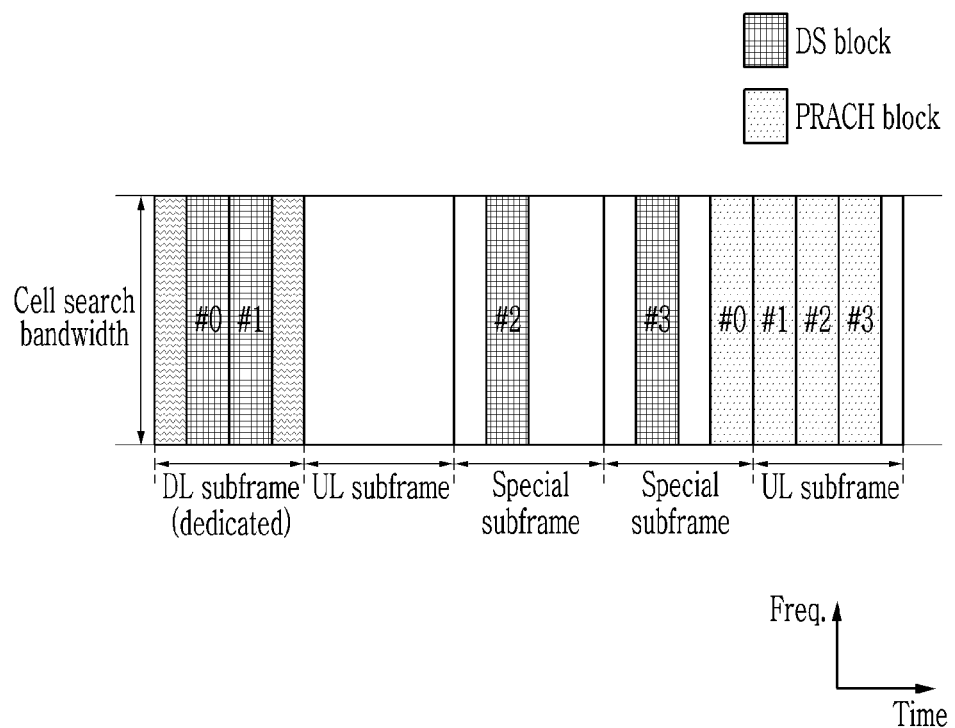
FIG. 18 is a view showing a discovery signal and a PRACH resource composition based on a method M321 and a method M331 according to an exemplary embodiment of the present invention.

FIG. 18 is a view showing a discovery signal and a PRACH resource composition based on a method M321 and a method M331 according to an exemplary embodiment of the present invention.

In detail, FIG. 18 illustrates of a case of M=4. That is, four discovery signal blocks and four PRACH blocks exist within one cell search bandwidth.

FIG. 18 as the exemplary embodiment of the method M331 illustrates a case in which $\{T_{S,m}\}$ has different values according to m and $\{T_{R,m}\}$ is 0 for all m. That is, the time domain distance between the m-th discovery signal block and the (m+1)-th discovery signal block has different values according to m. The time domain distance between the m-th PRACH block and the (m+1)-th PRACH block is 0 regardless of m.

Also, FIG. 18 as an exemplary embodiment of the method M321 illustrates a case in which $\{T_{G,m}\}$ may have the different values according to m. That is, the time domain distance between the m-th discovery signal block and the m-th PRACH block has the different values according to m.

According to the method M331, as the base station has some degree of freedom in the resource configuration of the discovery signal block and the resource configuration of the PRACH block, the base station may flexibly operate the entire resource. For example, as illustrated in FIG. 18, in a case of the traffic condition in which the downlink transmission and the uplink transmission must be quickly crossed into the subframe unit (for example, the DL subframe->the UL subframe->the special subframe->the special subframe->the UL subframe), as the base station disperses and allocates the discovery signal block and the PRACH block at the appropriate positions within one periodicity, the resource may be efficiently managed.

Also, the method M331 is more advantageous than the method M330 in terms of forward compatibility. $\{T_{G,m}\}$, $\{T_{S,m}\}$, and/or $\{T_{R,m}\}$ may have the fixed value for all periodicities of the discovery signal occasion or may have different values for each periodicity. When the position of the resource is changed over different periodicities of the discovery signal occasion, RRM measurement accuracy of the terminal may decrease. Accordingly, although the base station arbitrarily determines the parameters (for example, $T_{G,m}$, $T_{S,m}$, and $T_{R,m}$), changing the resource position over different periodicities by the base station may be limited. For example, the parameter (for example, $T_{G,m}$, $T_{S,m}$, $T_{R,m}$, etc.) may have the same value for every periodicity of the discovery signal occasion. That is, the parameter (for example, $T_{G,m}$, $T_{S,m}$, $T_{R,m}$, etc.) may be applied as the same value for every periodicity of the discovery signal occasion.

Meanwhile, when the terminal performs the random access, to satisfy various uplink coverage requirements, a plurality of PRACH formats may be used.

In general, as a size of the time-frequency resource of the PRACH increases, the random access coverage and the access collision probability between terminals are improved. The plurality of PRACH formats used in the LTE have the same bandwidth, however, the plurality of PRACH formats have different time domain resource lengths from each other according to the numerology or the repetition of the preamble sequence.

Similarly in the NR, because there are requirements for the various coverage and the access attempt probability, the plurality of PRACH formats are necessary.

For example, in the case of the small cell, because the coverage is small and the number of terminals attempting access is small, the short random access preamble may be required. Also, like the method M310, when the M PRACH resources exist and the terminal tries the access in one PRACH resource among the M PRACH resources, the probability of the access collision further decreases in each PRACH resource. In contrast, in the case of the micro cell or the small M value in the method M310, because the coverage is wide and the access collision probability increases, a long random access preamble or repeated transmission may be required.

When the plurality of PRACH formats exist, the base station may transmit the PRACH format to the terminal through the discovery signal. This is referred to as a method M340. The terminal may generate the random access preamble according to the obtained PRACH format through the discovery signal reception and may transmit the random access preamble on the PRACH resource. The PRACH format or the PRACH resource configuration information may be transmitted through the PBCH as a system information rather than through the synchronization signal or the BRS. For example, the base station may transmit at least one among a plurality of PRACH formats to the terminal through the PBCH included in the discovery signal block.

The above-described discovery signal, the PRACH resource configuration method, and the initial access procedures may be applied for any numerology. In the case that the carrier consists of a plurality of numerologies, like the case of the above-described synchronization signal, the plurality of numerologies may share the common discovery signal and PRACH. In this case, for the numerology of the discovery signal, the method M221 or the method M222 may be applied.

Also, the discovery signal and the PRACH may be defined for each numerology within one carrier. In this case, for the numerology of the discovery signal, the method M231, the method M232, or the method M233 may be applied. The numerology of the PRACH may be the same as the numerology of the discovery signal, or a separate numerology for the PRACH may be used.

Figure 19:
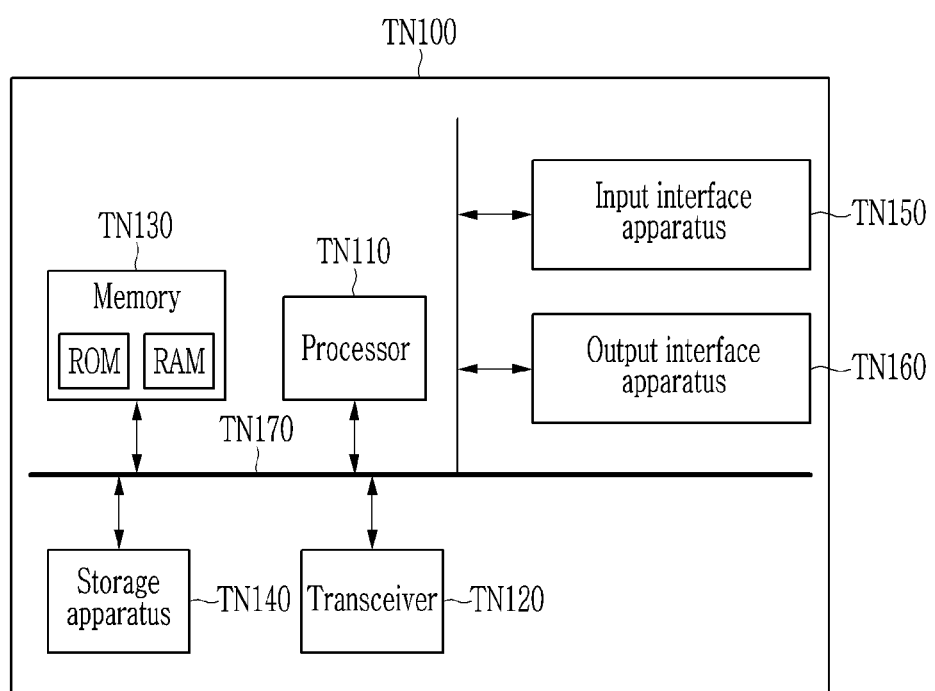
FIG. 19 is a view showing a computing apparatus according to an exemplary embodiment of the present invention.

FIG. 19 is a view showing a computing apparatus according to an exemplary embodiment of the present invention. A computing apparatus TN100 of FIG. 19 may be the base station or the terminal described in the present specification. Also, the computing apparatus TN100 of FIG. 19 may be a wireless apparatus, a communication node, a transmitter, or a receiver.

In the exemplary embodiment of FIG. 19, the computing apparatus TN100 includes at least one processor TN110, a transceiver TN120 connected to a network and performing the communication, and a memory TN130. Also, the computing apparatus TN100 may further include a storage apparatus TN140, an input interface apparatus TN150, an output interface apparatus TN160, etc. The constituent elements included in the computing apparatus TN100 are connected to each other by a bus TN170 to perform the communication with each other.

The processor TN110 may execute a program command stored in at least one of the memory TN130 and the storage apparatus TN140. The processor TN110 may mean a central processing unit (CPU), a graphics processing unit (GPU), or a dedicated processor performing the methods according to an exemplary embodiment of the present invention. The processor TN110 may be configured to realize the procedure, the function, and the methods that are described in relation to an exemplary embodiment of the present invention. The processor TN110 may control each constituent element of the computing apparatus TN100.

Each of the memory TN130 and the storage apparatus TN140 may store various information related to the operation of the processor TN110. Each of the memory TN130 and the storage apparatus TN140 may be composed of at least one of a volatile storage medium and a non-volatile storage medium. For example, the memory TN130 may be composed of at least one of a read-only memory (ROM) and a random access memory (RAM).

The transceiver TN120 may transmit and receive a wire signal or a wireless signal. Also, the computing apparatus TN100 may have a single antenna or a multi-antenna.

The exemplary embodiments of the present invention are not only embodied by the above-mentioned method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting discovery signals, performed by a base station operating a cell, the method comprising:
generating M discovery signal blocks, each of the M discovery signal blocks including a primary synchronization signal (PSS), a secondary synchronization signal (SSS) and a physical broadcast channel (PBCH), and a reference signal for demodulation of the PBCH, wherein M is a natural number equal to or greater than 1;
determining a frequency resource for transmitting the M discovery signal blocks as one of candidate frequency resources in a frequency band to which the cell belongs; and
transmitting the M discovery signal blocks through the determined frequency resource,
wherein a frequency location of each of the candidate frequency resources is derived by each of frequency reference points, and a spacing of frequency reference points is defined as an integer multiple of a subcarrier spacing.

2. The method according to claim 1, wherein the each of the frequency reference points indicates a center frequency location of the each of the candidate frequency resources.

3. The method according to claim 1, wherein the subcarrier spacing is one of subcarrier spacing(s) used for transmitting the discovery signals in the frequency band.

4. The method according to claim 1, wherein the spacing of the frequency reference points is further defined as an integer multiple of a bandwidth of a resource block (RB) consisting of subcarriers based on the subcarrier spacing.

5. The method according to claim 4, wherein the RB consists of 12 subcarriers.

6. The method according to claim 1, wherein the spacing of the frequency reference points for a higher frequency band is wider than the spacing of the frequency reference points for a lower frequency band.

7. A method for receiving discovery signals, performed by a terminal, the method comprising:
- receiving a primary synchronization signal (PSS) among M PSSs constituting M discovery signal blocks through one of candidate frequency resources in a frequency band to which a cell belongs, each of the M discovery signal blocks including a PSS, a secondary synchronization signal (SSS) and a physical broadcast channel (PBCH), and a reference signal for demodulation of the PBCH, wherein M is a natural number equal to or greater than 1;
- receiving a SSS, a PBCH, and a reference signal for demodulation of the PBCH through the one of the candidate frequency resources where the terminal received the PSS,
- wherein a frequency location of each of the candidate frequency resources is derived by each of frequency reference points, and a spacing of frequency reference points is defined as an integer multiple of a subcarrier spacing.

8. The method according to claim 7, wherein the each of the frequency reference points indicates a center frequency location of the each of the candidate frequency resources.

9. The method according to claim 7, wherein the subcarrier spacing is one of subcarrier spacing(s) used for transmitting the discovery signals in the frequency band.

10. The method according to claim 7, wherein the spacing of the frequency reference points is further defined as an integer multiple of a bandwidth of a resource block (RB) consisting of subcarriers based on the subcarrier spacing.

11. The method according to claim 10, wherein the RB consists of 12 subcarriers.

12. The method according to claim 7, wherein the spacing of the frequency reference points for a higher frequency band is wider than the spacing of the frequency reference points for a lower frequency band.

* * * * *